US012735129B2

(12) United States Patent
Yang et al.

(10) Patent No.: US 12,735,129 B2
(45) Date of Patent: Sep. 15, 2026

(54) ROBOT

(71) Applicant: Beijing Ke Yi Technology Co., Ltd., Beijing (CN)

(72) Inventors: Jianbo Yang, Beijing (CN); Linjie Cao, Beijing (CN); Chen Zang, Beijing (CN)

(73) Assignee: Beijing Ke Yi Technology Co., Ltd., Beijing (CN)

( * ) Notice: Subject to any disclaimer, the term of this patent is extended or adjusted under 35 U.S.C. 154(b) by 240 days.

(21) Appl. No.: 18/708,962

(22) PCT Filed: Nov. 26, 2022

(86) PCT No.: PCT/CN2022/134530
§ 371 (c)(1),
(2) Date: May 9, 2024

(87) PCT Pub. No.: WO2023/093869
PCT Pub. Date: Jun. 1, 2023

(65) Prior Publication Data

US 2025/0010930 A1 Jan. 9, 2025

(30) Foreign Application Priority Data

Nov. 26, 2021 (CN) ........................ 202111437472.X
Nov. 23, 2022 (CN) ........................ 202211477892.5

(51) Int. Cl.
*B62D 61/12* (2006.01)

(52) U.S. Cl.
CPC .................................. *B62D 61/12* (2013.01)

(58) Field of Classification Search
CPC ......... B62D 61/12; B62D 57/028; B25J 5/007
See application file for complete search history.

(56) References Cited

U.S. PATENT DOCUMENTS 5,158,493 A * 10/1992 Morgrey ............... B62D 57/02 901/1
5,515,934 A 5/1996 Davis
5,739,655 A * 4/1998 Torii ..................... B62D 57/00 305/1
6,112,843 A 9/2000 Wilcox et al.
(Continued)

FOREIGN PATENT DOCUMENTS

CN 2614752 Y 5/2004
CN 103616892 A 3/2014
(Continued)

OTHER PUBLICATIONS

International Search Report, mailed Jan. 16, 2023, from PCT/CN2022/134530, 6 pages.
(Continued)

*Primary Examiner* — Russell Frejd
(74) *Attorney, Agent, or Firm* — Workman Nydegger

(57) ABSTRACT

A robot includes a control system, a trunk module, and a leg module connected to the trunk module. The leg module includes at least one leg assembly. The leg assembly includes a plurality of connected moving elements. The control system can control at least one moving element to switch between a state of being lifted off the ground and a state of being in contact with the ground, so as to change the overall state of the robot.

14 Claims, 16 Drawing Sheets

(56) References Cited

U.S. PATENT DOCUMENTS

| | | | | |
|---|---|---|---|---|
| 2005/0120820 | A1* | 6/2005 | Takenaka | B25J 19/0091 74/490 |
| 2008/0105481 | A1 | 5/2008 | Hutcheson et al. | |
| 2008/0297091 | A1* | 12/2008 | Park | B25J 19/0091 901/1 |
| 2009/0114460 | A1 | 5/2009 | Amino et al. | |
| 2020/0368629 | A1 | 11/2020 | Moss | |

FOREIGN PATENT DOCUMENTS

| | | | |
|---|---|---|---|
| CN | 107685325 | A | 2/2018 |
| CN | 108128366 | A | 6/2018 |
| CN | 108327812 | A | 7/2018 |
| CN | 108555935 | A | 9/2018 |
| CN | 109986579 | A | 7/2019 |
| CN | 110217308 | A | 9/2019 |
| CN | 110962957 | A | 4/2020 |
| CN | 111731405 | A | 10/2020 |
| CN | 111913490 | A | 11/2020 |
| CN | 112433535 | A | 3/2021 |
| CN | 112776915 | A | 5/2021 |
| CN | 113467467 | A | 10/2021 |
| CN | 113479273 | A | 10/2021 |
| CN | 114260910 | A | 4/2022 |
| CN | 217703430 | U | 11/2022 |
| EP | 3441197 | A1 | 2/2019 |
| JP | 2001150370 | A | 6/2001 |
| JP | 2007290054 | A | 11/2007 |
| JP | 2009101484 | A | 5/2009 |
| JP | 2021062793 | A | 4/2021 |

OTHER PUBLICATIONS

Japanese Office Action, mailed Mar. 5, 2025 , from JP patent application No. 2024-524373, 11 pages.

Chinese First Office Action, mailed Apr. 28, 2025, from CN Patent Applic. No. 202211512990.8, 21 pages.

European Partial Search Report, mailed Feb. 12, 2025, from EP Applic. No. 22897950.6, 12 pages.

Chinese First Office Action, mailed Jan. 14, 2026, from Chinese Patent App. No. 202211477892.5, 15 pages.

Japanese Notice of Reasons for Refusal, mailed, Jan. 27, 2026, from Japanese Patent App. No. 2024-524373, 8 pages.

* cited by examiner

ROBOT

CROSS-REFERENCE TO RELATED APPLICATIONS

The present application is a National Stage of International Application No. PCT/CN2022/134530 filed on Nov. 26, 2022, which claims priority to Chinese Patent Application No. 202111437472.X, filed with the China National Intellectual Property Administration on Nov. 26, 2021, and entitled "Robot", and Chinese Patent Application 202211477892.5, filed with the China National Intellectual Property Administration on Nov. 23, 2022, and entitled "Robot", the entire contents of which are hereby incorporated by reference.

TECHNICAL FIELD

The present application relates to the technical field of artificial intelligent devices, and in particular to a robot.

BACKGROUND

With the development of artificial intelligence technology, robots have begun to enter the family scene, and especially robots with children's education and companionship roles are very popular among parents in the market. However, the actions of the existing robots are not flexible enough.

SUMMARY

Embodiments of the present application provide a robot.

Embodiments of the present application provide a robot, including a control system, a trunk module, and a leg module connected to the trunk module. The leg module includes at least one leg assembly. The leg assembly further includes a plurality of connected moving elements. The control system is able to control at least one of the moving elements to switch between a state of being lifted off the ground and a state of being in contact with the ground, so as to change the overall state of the robot.

In some embodiments, the trunk module includes a first action component. An output end of the first action component is drivingly connected to the leg module.

In some embodiments, the leg module includes at least two leg assemblies arranged on opposite sides of the trunk module. The trunk module is rotatable relative to the leg assemblies.

In some embodiments, the leg assembly further includes a wheel frame connected to the plurality of moving elements. The control system controls the wheel frame to rotate relative to the trunk module so that the moving element switches between the state of being lifted off the ground and the state of being in contact with the ground.

In some embodiments, the wheel frame includes a plurality of connecting sections and a joint for connecting the connecting sections. The control system is able to control the plurality of connecting sections to move relative to each other through the joint.

In some embodiments, the wheel frame includes a first structural member rotatably connected to the trunk module. One side of the first structural member away from the trunk module is rotatably connected to the plurality of moving elements.

In some embodiments, the wheel frame includes a second structural member and a third structural member.

The second structural member is rotatably connected to the trunk module. One side of the second structural member away from the trunk module is rotatably connected to at least one moving element.

The third structural member is rotatably connected to the trunk module. One side of the third structural member away from the trunk module is rotatably connected to at least one moving element.

In some embodiments, the wheel frame further includes a telescopic mechanism.

One end of the telescopic mechanism is movably connected to the second structural member, and the other end of the telescopic mechanism is movably connected to the third structural member, for controlling an angle change of a first included angle. The first included angle is an included angle of an opening formed by the second structural member and the third structural member away from the trunk module.

In some embodiments, the second structural member and the third structural member are rotatably connected to the trunk module through the same rotating shaft. The third structural member is located between the second structural member and the trunk module.

In some embodiments, the wheel frame includes a fourth structural member and a fifth structural member.

One end of the fourth structural member is hinged to the trunk module, and the other end of the fourth structural member is hinged to the fifth structural member. The fifth structural member is rotatably connected to a plurality of moving elements.

The control system adjusts the distance between two moving elements and/or an included angle formed between two moving elements through the fourth structural member and the fifth structural member. The two moving elements are oppositely arranged on both sides of the trunk module.

In some embodiments, the leg module includes two leg assemblies, defined as a first leg assembly and a second leg assembly respectively. The first leg assembly includes a first wheel frame and moving elements provided on the first wheel frame. The moving elements provided on the first wheel frame are defined as the first moving elements. The number of the first moving elements is at least two. The first moving elements are arranged at opposite ends of the first wheel frame. The second leg assembly includes a second wheel frame and moving elements provided on the second wheel frame. The moving elements provided on the second wheel frame are defined as second moving elements. The number of the second moving elements is at least two. The second moving elements are arranged at opposite ends of the second wheel frame.

In some embodiments, the number of the first moving elements is two, and at least one of the two first moving elements is a driving wheel, defined as a first driving wheel. The control system is able to control the first driving wheel to rotate.

In some embodiments, the number of the second moving elements is two, and at least one of the two second moving elements is a driving wheel, defined as a second driving wheel. The control system is able to control the second driving wheel to rotate.

In some embodiments, the first action component includes a plurality of output ends, and each output end is drivingly connected to one corresponding wheel frame.

In some embodiments, the plurality of output ends are driven simultaneously by the same driving member or driven respectively by a plurality of driving members.

In some embodiments, the first action component includes two output ends provided at opposite ends of the trunk module. The two output ends are driven respectively by two driving members and defined as a first output end and a second output end. The first output end is drivingly connected to the first wheel frame, and the second output end is drivingly connected to the second wheel frame.

In some embodiments, the robot further includes a sensing system. The sensing system monitors the component posture and the position state of the robot. The control system obtains the overall state of the robot according to the component posture and the position state. When the overall state is a tipping or tilting state, the control system controls the trunk module to rotate relative to the leg module and/or the moving element to rotate, so that the robot balances autonomously.

In some embodiments, the sensing system includes an angle detection component that detects a relative angle between the leg module and the trunk module. The control system obtains the component posture of the robot according to the relative angle.

In some embodiments, the sensing system further includes a first sensing component that monitors a positional relationship of the center of gravity of the robot relative to the ground to obtain the position state of the robot. The control system determines whether the robot has a tendency to tip over according to the position state and the component posture. When the robot has a tendency to tip over, the control system controls the trunk module to rotate relative to the leg module and/or the moving element to rotate, so that the robot generates torque in a direction opposite to a tipping direction to prevent the robot from tipping over.

In some embodiments, the control system further determines whether the robot is in the tipping state according to the position state and the component posture. When the robot is in the tipping state, the control system controls the trunk module to rotate relative to the leg module and/or the moving element to rotate, so as to make the robot in a standing state.

In some embodiments, the first sensing component obtains trunk position information by monitoring a positional relationship of the center of gravity of the trunk module relative to the ground. The control system obtains leg position information according to the trunk position information and the component posture. The control system obtains the position state of the robot according to the trunk position information and the leg position information.

In some embodiments, the first sensing component includes a trunk detection component and a leg detection component. The trunk detection component obtains trunk position information by monitoring a positional relationship of the center of gravity of the trunk module relative to the ground. The leg detection component obtains leg position information by monitoring a positional relationship of the center of gravity of the leg module relative to the ground. The control system obtains the position state of the robot according to the trunk position information and the leg position information.

In some embodiments, the trunk module includes a head-face assembly and a body assembly connected movably. The body assembly connects the head-face assembly with the leg module. Rotation of the body assembly relative to the leg module drives rotation of the head-face assembly relative to the leg module.

DESCRIPTION OF REFERENCE NUMBERS

Figures 1, 2:
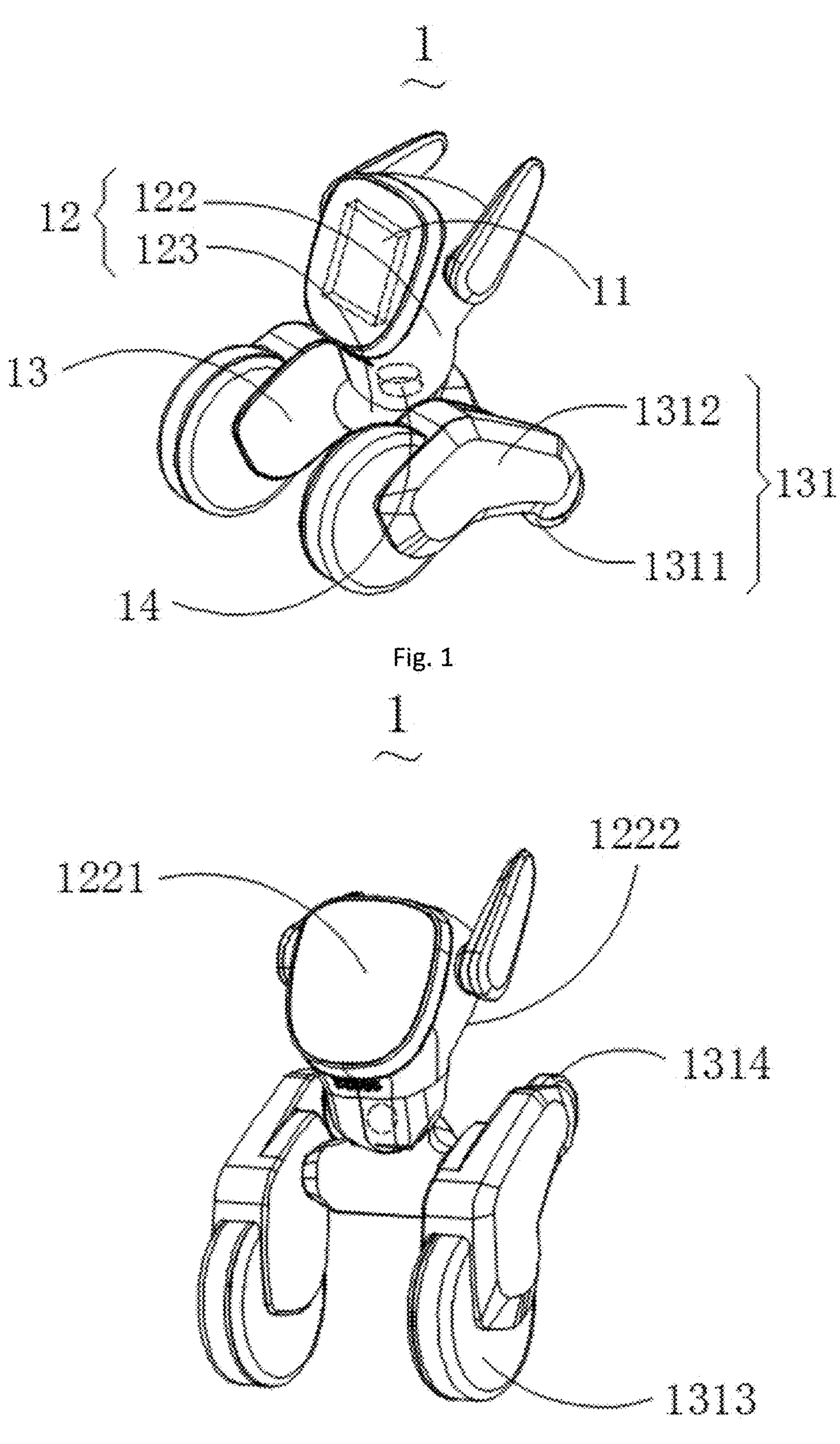
FIG. 1 is a first schematic diagram of a three-dimensional state of a robot according to an embodiment of the present application.
FIG. 2 is a second schematic diagram of a three-dimensional state of a robot according to an embodiment of the present application.

1. Robot;
11. Control system; 12. Trunk module; 13. Leg module; 14. Sensing system;
121. First action component; 122. Head-face assembly; 123. Body assembly; 124.
Screen; 131. Leg assembly; 141. First sensing component; 142. Second sensing component; 143. Angle detection component;
1211. Output end; 1212. Driving member; 1221. Face; 1222. Back of the head; 1311. Moving element; 1311*a*. Moving element; 1311*b*. Moving element; 1312. Wheel frame; 1313 Driving wheel; 1314. Driven wheel; 1315. Second action component; 1411. Trunk detection component; 1412. Leg detection component; 13121. First structural member; 13122. Second structural member; 13123. Third structural member; 13124. Telescopic mechanism; 13125. Fourth structural member; 13126. Fifth structural member.

DETAILED DESCRIPTION

In order to make the objects, technical solutions, and advantages of the present application more clear, the present application will be further described in detail below with reference to FIGS. 1 to 13 and implementation examples. It should be understood that the specific embodiments described herein are only used to explain but not limit the present application.

It should be noted that the terms such as "first" and "second" in the specification and claims are used to distinguish different objects, rather than describing a particular sequence.

It should be noted that, when an element is referred to as being "fixed" to another element, the element may be directly on the other element, or there may also be intervening elements. When an element is said to be "connected" to another element, the element may be directly connected to the other element, or there may be intervening elements. The terms "vertical," "horizontal," "left," "right" and similar expressions are used herein for illustrative purpose only.

In the present application, the orientation or position relationships indicated by the terms "above", "below", "left", "right", "front", "rear", "top", "bottom", "inner", "outer", "middle", "vertical", "horizontal", "lateral", "longitudinal", etc. are orientation or position relationships shown based on the drawings. These terms are mainly used to better describe the present application and the embodiments thereof, and are not intended to limit the indicated apparatus, element or component to have a particular orientation or to be constructed and operated in a particular orientation.

Moreover, some of the above terms may also be used to express other meanings in addition to indicating orientation or positional relationships. For example, the term "above" may also be used to express a certain dependence relationship or connection relationship in some cases. Those having ordinary skills in the art may understand the specific meanings of these terms in the present application according to specific situations.

In addition, the terms "install", "arrange", "provided with", "connect" and "couple" should be understood in a broad sense. For example, the connection may be a fixed connection or detachable connection or integral connection; may be a mechanical connection or electrical connection; may be a direct connection, or indirect connection through an intermediate medium, or internal communication between two apparatuses, elements or components. Those having ordinary skills in the art may understand the specific meanings of the above-mentioned terms in the present application according to specific situations.

In combination with FIGS. 1 and 2, a first embodiment of the present application provides a robot 1. The robot 1 includes a control system 11, a trunk module 12, and a leg module 13 connected to the trunk module 12. Here, the leg module 13 includes at least one leg assembly 131. The leg assembly 131 includes a plurality of connected moving elements 1311. The control system 11 controls at least one moving element 1311 to switch between a state of being lifted off the ground and a state of being in contact with the ground, to change the overall state of the robot 1. It should be understood that the relative positional relationship of various components of the robot 1 constitutes the component posture of the robot 1 itself. The positional relationship of the robot 1 relative to the ground constitutes the position state of the robot 1. The component posture of the robot 1 and the position state of the robot 1 jointly determine the overall state of the robot 1.

It can be understood that the control system 11 can control at least one moving element 1311 to switch between the state of being lifted off the ground and the state of being in contact with the ground, thereby changing the overall state of the robot 1 and making the actions of the robot 1 more flexible and changeable. For example, when all the moving elements 1311 are in contact with the ground, the robot 1 is in a prone position, like a cute pet with all feet on the ground. When some of the moving elements 1311 are lifted off the ground, the robot 1 is in the standing state, like a cute pet with some feet standing and some feet lifted. The actions of the robot 1 are more flexible and richer, providing basic conditions for the in-depth advancement of human-computer interaction. Moreover, the design that the control system 11 can control at least one moving element 1311 to switch between the state of being lifted off the ground and the state of being in contact with the ground enables the robot 1 to adapt to more complex environments. For example, the robot 1 can control some of the moving elements 1311 to be lifted off the ground to bypass obstacles; or when the robot 1 has a tendency to tilt, the moving elements 1311 that are lifted off the ground are switched to the state of being in contact with the ground, to prevent the robot 1 from tipping over. As can be seen, the design that the control system 11 can control at least one moving element 1311 to switch between the state of being lifted off the ground and the state of being in contact with the ground greatly improves the flexibility, adaptability and reliability of the actions of the robot 1.

It should be understood that the location of the control system 11 is not limited, as long as the control system 11 can realize the control function. Optionally, the control system 11 may be centrally provided on the trunk module 12, the leg module 13 or an external terminal; or the control system 11 may be distributedly provided on the trunk module 12 and the leg module 13; or the control system 11 may be partially provided on the trunk module 12 and/or the leg module 13 and partially provided on the external terminal.

Further, the leg module 13 includes at least two leg assemblies 131. The leg assemblies 131 can move relative to the trunk module 12, to thereby drive the moving elements 1311 to move relative to the trunk module 12. Optionally, the leg assemblies 131 are arranged on the side and/or bottom of the body assembly 123.

Further, at least two leg assemblies 131 are arranged on opposite sides of the trunk module 12.

It can be understood that the design of arranging at least two leg assemblies 131 on opposite sides of the trunk module 12 makes the overall design of the robot 1 more symmetrical, and thus makes the overall center of gravity of the robot 1 relatively more centered, so that the robot 1 is easier to maintain balance and stability, further improving the adaptability of the robot 1 to different terrains. Moreover, the design of the leg assemblies 131 arranged on opposite sides of the trunk module 12 allows the center of gravity of the trunk module 12 to be relatively closer to the ground, thus reducing the height of the overall center of gravity of the robot 1, further improving the stability of the robot 1 and making it less likely to tip over, and thereby further improving the adaptability of the robot 1 to the environment.

Specifically, in some embodiments of the present application, the number of leg assemblies 131 is two. The two leg assemblies 131 are respectively defined as a first leg assembly 131 and a second leg assembly 131. The first leg assembly 131 and the second leg assemblies 131 are arranged on opposite sides of the trunk module 12.

Figures 3, 4:
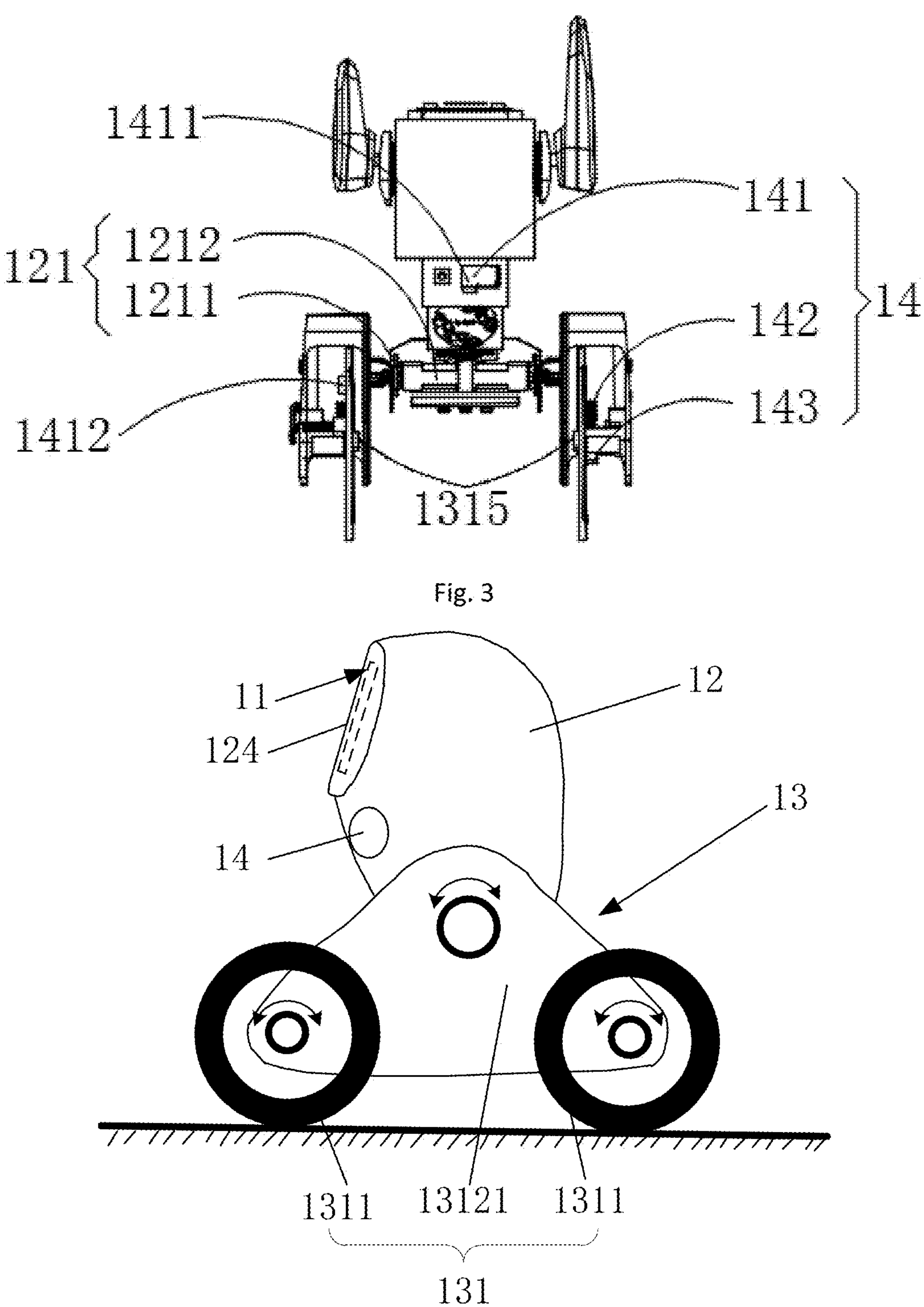
FIG. 3 is a schematic diagram of a partial structure of a robot according to an embodiment of the present application.
FIG. 4 is a third schematic diagram of a three-dimensional state of a robot according to an embodiment of the present application.

Referring to FIGS. 1 to 3, the trunk module 12 further includes a first action component 121. The first action component 121 includes an output end 1211. The output end 1211 is drivingly connected to the leg assembly 131, so as to drive the leg assembly 131 to move relative to the trunk module 12.

It should be understood that the output end 1211 of the first action component 121 can be provided at a corresponding position on the body assembly 123 corresponding to the position of the leg assembly 131. Specifically, in some embodiments of the present application, the output ends 1211 of the first action component 121 are respectively provided at the opposite ends of the trunk module 12 corresponding to the first leg assembly 131 and the second leg assembly 131.

Optionally, the manner in which the leg assembly 131 moves relative to the trunk module 12 is not limited, and maybe, but is not limited to, rotation, rolling, reciprocating motion, etc. Specifically, in some embodiments of the present application, the manner in which the leg assembly 131 moves relative to the trunk module 12 is rotation.

It can be understood that the arrangement of the first action component 121 with the output end 1211 drivingly connected to the leg module 13 enables the leg module 13 to move relative to the trunk module 12, so that the robot 1 can realize the function that the trunk module 12 and the leg module 13 can move separately or only one of the two modules moves as needed, thereby further effectively improving the flexibility of the movement and action of the robot 1 and the adaptability of the robot 1 to the environment, and also further enhancing the expressiveness of the robot 1, and making the robot 1 more in line with the bionic requirement.

Further, the trunk module 12 also includes a head-face assembly 122 and a body assembly 123 connected movably. The body assembly 123 movably connects the head-face assembly 122 with the leg module 13. The rotation of the body assembly 123 relative to the leg module 13 drives the rotation of the head-face assembly 122 relative to the leg module 13.

Further, the head-face assembly 122 includes two opposite sides, where the face 1221 is provided on one side and the back of the head 1222 is provided on the other side. This design makes the robot 1 more bionic.

It can be understood that the body assembly 123 connects the head-face assembly 122 with the leg module 13, and the rotation of the body assembly 123 relative to the leg module 13 drives the rotation of the head-face assembly 122 relative to the leg module 13, so that the head-face assembly 122 of the robot 1 can rotate relative to the leg module 13 through the rotation of the body assembly 123, further improving the richness and flexibility of the actions of the robot 1, and simultaneously making the bionic effect of the robot 1 better.

Further, the first action component 121 is arranged on the body assembly 123, and the output end 1211 of the first action component 121 can drive the leg module 13 to rotate relative to the body assembly 123.

Optionally, the first action component 121 includes one or more output ends 1211. Specifically, in some embodiments of the present application, the first action component 121 includes a plurality of output ends 1211 that are drivingly connected to the leg assemblies 131.

Further, the number of output ends 1211 corresponds to the number of leg assemblies 131. Each output end 1211 is drivingly connected to one leg assembly 131 in one-to-one correspondence. Optionally, the plurality of output ends 1211 are driven by the same driving member 1212 at the same time or driven by a plurality of driving members 1212 respectively.

It can be understood that the design of arranging the plurality of output ends 1211 and drivingly connecting each output end 1211 to one corresponding leg assembly 131 ensures that each leg assembly 131 can rotate relative to the trunk module 12 under the drive of the output end 1211, so that the robot 1 can make corresponding actions according to needs, thereby further improving the action flexibility of the robot 1.

When the plurality of output ends 1211 are driven by the same driving member 1212 at the same time, a plurality of leg assemblies 131 can act synchronously, so as to implement actions such as the same ends of the plurality of leg assemblies 131 are in contact with the ground at the same time and the other ends thereof are lifted off the ground at the same time. When the plurality of output ends 1211 are driven by a plurality of driving members 1212 respectively, the plurality of leg assemblies 131 can also act autonomously, so as to implement actions such as one end of only one leg assembly 131 is in contact with the ground and the other end thereof is lifted off the ground while both ends of other leg assemblies 131 are in contact with the ground.

Optionally, the type of the driving member 1212 is not limited, and may be but is not limited to a motor, a cylinder, etc., as long as the driving member 1212 can drive the leg assembly 131 to act accordingly. Specifically, in some embodiments of the present application, the driving member 1212 is a motor.

Specifically, in some embodiments of the present application, the first action component 121 includes two output ends 1211 provided at opposite ends of the trunk module 12. Optionally, the two output ends 1211 are driven by a motor at the same time or driven by two motors respectively. Specifically, in some embodiments of the present application, the two output ends 1211 are driven by two motors respectively. The two output ends 1211 are defined as a first output end 1211 and a second output end 1211. The motor corresponding to the first output end 1211 is defined as a first motor, and the motor corresponding to the second output end 1211 is defined as a second motor. The first output end 1211 is drivingly connected to the first leg assembly 131, and the second output end 1211 is drivingly connected to the second leg assembly 131.

It can be understood that, corresponding to the two leg assemblies 131, the design of arranging output ends 1211 driven by two driving members 1212 respectively ensures that both of the two leg assemblies 131 can act autonomously under the drive of the output ends 1211, further improving the flexibility of the actions of the robot 1 and simultaneously making the bionic effect of the robot 1 better.

Further, the leg assembly 131 also includes a wheel frame 1312 connected to a plurality of moving elements 1311. The output end 1211 of the first action component 121 is drivingly connected to the wheel frame 1312. The control system 11 controls the rotation of the output end 1211 of the first action component 121 to drive the wheel frame 1312 to rotate relative to the trunk module 12, thereby driving the moving elements 1311 to switch between the state of being lifted off the ground and the state of being in contact with the ground.

It can be understood that, by arranging the wheel frame 1312 connected to the plurality of moving elements 1311, the control system 11 can control the rotation of the wheel frame 1312 relative to the trunk module 12 to switch the moving elements 1311 between the state of being lifted off the ground and the state of being in contact with the ground, thereby changing the overall state of the robot 1. The design of the wheel frame 1312 allows a plurality of moving elements 1311 in the same leg assembly 131 to move in association, thereby enriching the actions of the robot 1. For example, some moving elements 1311 in contact with the ground on one leg assembly 131 support other moving elements 1311 to lift off the ground, so that the robot 1 can complete the action that some of the moving elements 1311 are in the state of being in contact with the ground and some of the moving elements 1311 are in the state of being lifted off the ground. Moreover, the way of connecting a plurality of moving elements 1311 in one leg assembly 131 through the wheel frame 1312 facilitates the synchronous movement of the plurality of moving elements 1311, thereby further improving the movement stability of the robot 1. It can be seen that the arrangement of the wheel frame 1312 further improves the richness and stability of actions of the robot 1.

Further, the first leg assembly 131 includes a first wheel frame 1312 and moving elements 1311 provided on the first wheel frame 1312. The moving elements 1311 provided on the first wheel frame 1312 are defined as the first moving elements. The number of first moving elements is at least two, and the first moving elements are arranged at opposite ends of the first wheel frame 1312. The second leg assembly 131 includes a second wheel frame 1312 and moving elements 1311 provided on the second wheel frame 1312. The moving elements 1311 provided on the second wheel frame 1312 are defined as second moving elements. The number of second moving elements is at least two, and the second moving elements are arranged at opposite ends of the second wheel frame 1312. Optionally, both the number of first moving elements and the number of second moving elements may be but not limited to 2, 3, 4, 5, 6, 7, 8, 9, 10, etc.

It can be understood that the design of arranging two leg assemblies 131 and arranging a plurality of moving elements 1311 at opposite ends of each leg assembly 131 further ensures the symmetry of the overall design of the robot 1 and thus ensures that the center of gravity of the robot 1 is relatively centered relative to the two leg assemblies 131, so that the overall stability of the robot 1 is higher, thereby also enabling the robot 1 to stably implement more relatively complex actions, and also enabling the robot 1 to extend at a relatively larger angle during action, thus further improving the flexibility and richness of actions of the robot 1. Moreover, the design of the plurality of moving elements 1311 arranged at opposite ends of each leg assembly 131 ensures that each leg assembly 131 can achieve the action that one end is in contact with the ground while the other end lifts off the ground, thus further ensuring the action diversity of the robot 1.

It can be understood that two output ends 1211 are drivingly connected to two wheel frames 1312. That is, the first output end 1211 is drivingly connected to the first wheel frame 1312, and the second output end 1211 is drivingly connected to the second wheel frame 1312.

Further, each leg assembly 131 also includes a second action component 1315 that is drivingly connected to at least one moving element 1311 and can drive the moving element 1311 to act, and the action of the moving element 1311 can drive the robot 1 to move. Moreover, each leg assembly 131 includes at least two moving elements 1311, of which at least one moving element 1311 is drivingly connected to the second action component 1315 as a driven moving element 1311, and the remaining moving elements 1311 that are not drivingly connected to the second action component 1315 are driven moving elements 1311. The action of the driving moving element 1311 drives the action of the driven moving elements 1311, thereby realizing the movement function of the robot 1.

It can be understood that, by arranging the second action component 1315 in the leg assembly 131 that can drive the moving elements 1311 to act and drive the robot 1 to move, the robot 1 can be driven to move as a whole through the second action component 1315, improving the movement flexibility of the robot 1. Furthermore, the second action component 1315 drives the moving elements 1311 to act, so that the overall acceleration of the robot 1 can also be changed through the action of the moving elements 1311 when the center of gravity of the robot 1 is unstable, so that the robot 1 can maintain or restore the balanced state with the help of various external forces such as motion inertia, motion resistance and gravity, thereby greatly improving the autonomous balancing ability and environmental adaptability of the robot 1.

Moreover, by setting one of the two moving elements 1311 as a driving wheel and the other as a driven wheel, the robot 1 can move under the drive of the driving wheel while maintaining balance under the support of the driven wheel. Furthermore, the setting of the driven wheel can reduce the friction force on the ground when the robot 1 moves, thereby further increasing the movement flexibility of the robot 1.

It should be understood that the type of the moving element 1311 is not limited, as long as the function of driving the robot 1 to move when the moving element 1311 acts can be implemented. Optionally, the moving element 1311 may be, but is not limited to, roller, crawler, etc. Specifically, in some embodiments of the present application, the moving elements 1311 are rollers, the corresponding driving moving element 1311 is a driving wheel 1313, and the corresponding driven moving element 1311 is a driven wheel 1314.

Further, the number of first moving elements is two, and at least one of the two first moving elements is a driving wheel 1313. The driving wheel 1313 in the first moving elements is defined as a first driving wheel 1313, and the driven wheel 1314 in the first moving elements is defined as a first driven wheel 1314. The control system 11 can control the first driving wheel 1313 to rotate. The number of second moving elements is two, and at least one of the two second moving elements is a driving wheel 1313. The driving wheel 1313 in the second moving elements is defined as a second driving wheel 1313, and the driven wheel 1314 in the second moving elements is defined as a second driven wheel 1314. The control system 11 can control the second driving wheel 1313 to rotate. When the moving elements 1311 land on the ground at the same time, the first driving wheel 1313 and the second driving wheel 1313 are located on one side of the body assembly 123, and the first driven wheel 1314 and the second driven wheel 1314 are located on the other side of the body assembly 123.

It can be understood that, by arranging the two driving wheels 1313 on one side of the body assembly 123 and the two driven wheels 1314 on the other side of the body assembly 123, the robot 1 can achieve a posture in which the two driving wheels 1313 land on the ground at the same time and the two driven wheels 1314 lift off the ground at the same time by rotating the leg assembly 131 relative to the body assembly 123, and the robot 1 in this posture can also stand by two wheels and can also move by moving the two driving wheels 1313 at the same time, thereby further improving the action flexibility and diversity of the robot 1.

Optionally, two driving wheels 1313 may be provided at one end of the wheel frame 1312 close to the face 1221, and two driven wheels 1314 may be provided at the other end of the wheel frame 1312 close to the back of the head 1222; or, two driven wheels 1314 may be provided at one end of the wheel frame 1312 close to the face 1221, and two driving wheels 1313 may be provided at the other end of the wheel frame 1312 close to the back of the head 1222. Specifically, in some embodiments of the present application, two driving wheels 1313 may be provided at one end of the wheel frame 1312 close to the face 1221, and two driven wheels 1314 may be provided at the other end of the wheel frame 1312 close to the back of the head 1222.

It can be understood that the design that at least one of the two first moving elements is a driving wheel 1313 enables the robot 1 to move under the drive of the first leg assembly 131, and moreover, the design that at least one of the two second moving elements is a driving wheel 1313 enables the robot 1 to also move under the drive of the second leg assembly 131, thereby ensuring the movement flexibility of the robot 1.

Further, the wheel frame 1312 includes a plurality of connecting sections and a joint for connecting the connecting sections. The control system 11 may control the plurality of connecting sections to move relative to each other through the joint.

It can be understood that the wheel frame 1312 is designed with the plurality of connecting sections that can move relatively through the joint, so that the action modes between the wheel frame 1312 and the moving elements 1311 on the wheel frame 1312 are more diverse, that is, the actions of the leg assemblies 131 are more flexible and changeable. For example, the robot 1 can support the trunk module 12 and other leg assemblies 131 through the joint in contact with the ground. Moreover, the connecting sections are movably connected through the joint, so that the center of gravity of the robot 1 can also be adjusted through the relative movement between the connecting sections when the robot 1 moves on uneven ground or the center of gravity is unstable, thereby making the stability of the robot 1 higher.

To sum up, in the robot 1 in the embodiments of the present application, the head-face assembly 122 is movably connected to the body assembly 123, and the first leg assembly 131 and the second leg assembly 131 are respectively connected to the opposite ends of the body assembly 123, where the first output end 1211 is drivingly connected to the first wheel frame 1312, and the second output end 1211 is drivingly connected to the second wheel frame 1312. The first driving wheel 1313 and the first driven wheel 1314 are respectively arranged at opposite ends of the first wheel frame 1312, and the second driving wheel 1313 and the second driven wheel 1314 are respectively arranged at opposite ends of the second wheel frame 1312. Here, each of the first driving wheel 1313 and the second driving wheel 1313 is arranged at one end of the wheel frame 1312 close to the face 1221, that is, each of the first driven wheel 1314 and the second driven wheel 1314 is arranged at one end of the wheel frame 1312 close to the back of the head 1222.

It can be understood that the wheel frame of the robot may also be of other structures. Other specific structures of the wheel frame are described in detail below.

In some embodiments, referring to FIG. 4, the wheel frame includes a first structural member 13121 rotatably connected to the trunk module 12, and one side of the first structural member 13121 away from the trunk module 12 is rotatably connected to a plurality of moving elements 1311.

Referring to FIG. 4, the trunk module 12 of the robot has a screen 124 that is connected to the control system 11 by a signal for realizing manual interaction. The robot 1 further includes a sensing system 14 that monitors the component posture and position state of the robot 1, and the control system 11 obtains the overall state of the robot 1 according to the component posture and position state. It should be noted that the sensing system 14 can also sense the external environment. For example, the sensing system includes at least one sensor, which can sense obstacles so that the robot has an obstacle avoidance function. The leg module 13 of the robot includes two leg assemblies 131, and the two leg assemblies 131 are arranged oppositely on both sides of the trunk module 12. Due to perspective issue, only the leg assembly 131 on one side of the trunk module 12 is shown in FIG. 4. The leg assembly 131 includes a wheel frame and moving elements 1311 arranged on the wheel frame. The first structural member 13121 of the wheel frame has three connecting ends. The first connecting end of the first structural member 13121 is rotatably connected to the trunk module 12 through a first rotating shaft, the second connecting end of the first structural member 13121 is rotatably connected to one of the moving elements 1311 through the second rotating shaft, and the third connecting end of the first structural member 13121 is rotatably connected to the other moving element 1311 through a third rotating shaft. Of course, FIG. 4 takes two moving elements as an example. When there are a plurality of moving elements, the first structural member has a connecting end that rotates in cooperation with any one of the moving elements. The control system 11 can realize switching among two-wheel landing, three-wheel landing and four-wheel landing forms by controlling the rotation of the wheel frame around the first rotating shaft, i.e., the connecting shaft between the wheel frame and the trunk module 12.

Figure 5:
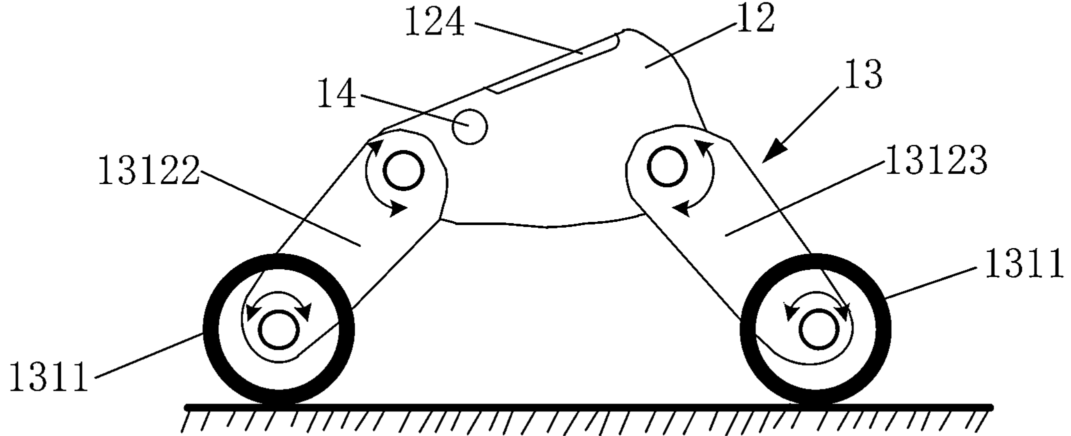
FIG. 5 is a fourth schematic diagram of a three-dimensional state of a robot according to an embodiment of the present application.
Figure 6:
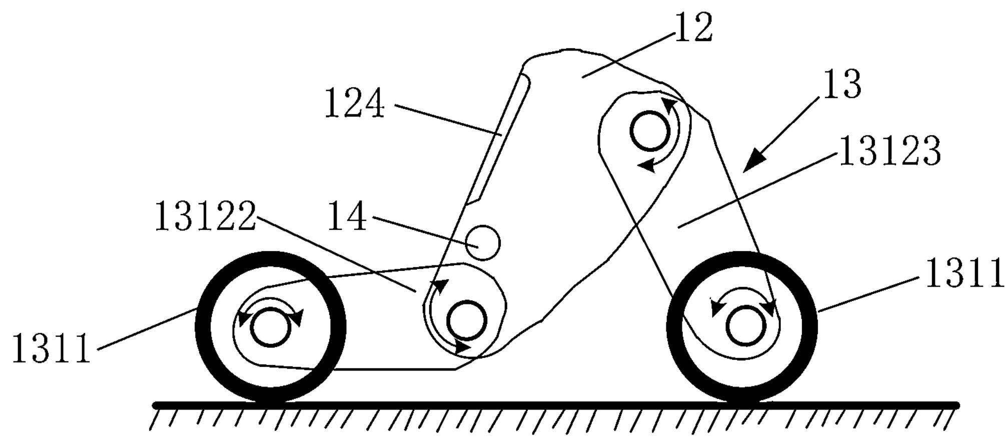
FIG. 6 is a fifth schematic diagram of a three-dimensional state of a robot according to an embodiment of the present application.

In some embodiments, referring to FIGS. 5 and 6, the wheel frame includes a second structural member 13122 and a third structural member 13123. The second structural member 13122 is rotatably connected to the trunk module 12, and one side of the second structural member 13122 away from the trunk module 12 is rotatably connected to at least one moving element 1311. The third structural member 13123 is rotatably connected to the trunk module 12, and one side of the third structural member 13123 away from the trunk module 12 is rotatably connected to at least one moving element 1311.

Referring to FIGS. 5 and 6, the difference from the structure in FIG. 4 is that the wheel frame includes the second structural member 13122 and third structural member 13123, the second structural member 13122 has two connecting ends, the first connecting end of the second structural member 13122 is rotatably connected to the trunk module 12 through a fourth rotating shaft, and the second connecting end of the second structural member 13122 is rotatably connected to one of the moving elements 1311 through a fifth rotating shaft; the third structural member 13123 has two connecting ends, the first connecting end of the third structural member 13123 is rotatably connected to the trunk module 12 through a sixth rotating shaft, and the second connecting end of the third structural member 13123 is rotatably connected to the other moving element 1311 through a seventh rotating shaft; and the fourth rotating shaft is parallel to the sixth rotating shaft. The control system 11 can realize switching among two-wheel landing, three-wheel landing and four-wheel landing forms by controlling the rotation of the wheel frame around the first rotating shaft, i.e., the connecting shaft between the wheel frame and the trunk module 12. Further, this structure can also adjust the center of gravity of the trunk module 12 in various landing forms, thereby increasing the variability of the robot. For example, the center of gravity of the robot is lowered from the posture in FIG. 5 to the posture in FIG. 6.

Figures 7, 8:
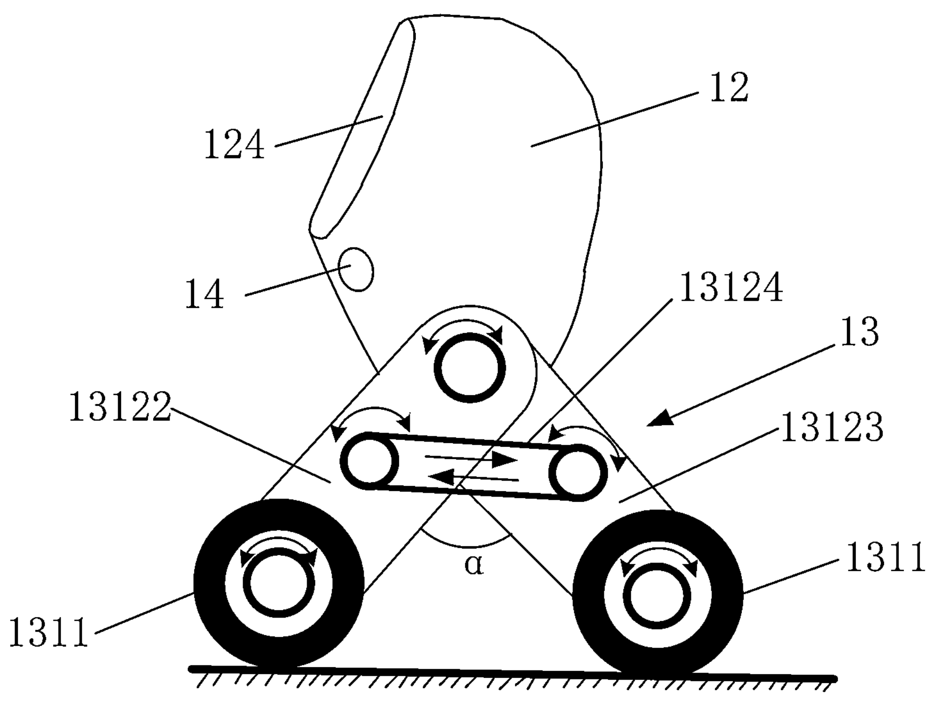
FIG. 7 is a sixth schematic diagram of a three-dimensional state of a robot according to an embodiment of the present application.
FIG. 8 is a seventh schematic diagram of a three-dimensional state of a robot according to an embodiment of the present application.

In some embodiments, referring to FIGS. 7 and 8, the wheel frame includes a second structural member 13122, a third structural member 13123 and a telescopic mechanism 13124. The second structural member 13122 is rotationally connected to the trunk module 12, and one side of the second structural member 13122 away from the trunk module 12 is rotatably connected to at least one moving element 1311. The third structural member 13123 is rotatably connected to the trunk module 12, and one side of the third structural member 13123 away from the trunk module 12 is rotatably connected to at least one moving element 1311. One end of the telescopic mechanism 13124 is movably connected to the second structural member 13122, and the other end of the telescopic mechanism 13124 is movably connected to the third structural member 13123, for controlling the angle change of a first included angle. The first included angle is an included angle of an opening formed by the second structural member 13122 and the third structural member 13123 away from the trunk module 12.

Referring to FIGS. 7 and 8, the difference from the structure in FIG. 5 is that the second structural member 13122 and the third structural member 13123 are connected through the telescopic mechanism 13124, the telescopic mechanism 13124 can adjust the included angle of the opening formed by the second structural member 13122 and the third structural member 13123 away from the trunk module 12, i.e., the first included angle $\alpha$, thereby adjusting the distance between the two moving elements 1311. That is to say, this structure can also adjust the center of gravity of the trunk module 12 in various landing forms, thereby increasing the variability of the robot. For example, from the posture in FIG. 7 to the posture in FIG. 8, the telescopic mechanism 13124 is shortened, the first included angle $\alpha$ becomes smaller, the two moving elements 1311 approach each other, and the center of gravity of the trunk module 12 rises. From the posture in FIG. 8 to the posture in FIG. 7, the telescopic mechanism 13124 stretches, the first included angle $\alpha$ becomes larger, the two moving elements 1311 are moved away from each other, and the center of gravity of the trunk module 12 is lowered.

It should be noted that the main function of the telescopic mechanism is to drive two moving elements closer or farther away through changes in length. Therefore, any structure that can realize the above function can be called the telescopic mechanism in the embodiments, such as a cylinder, a hydraulic cylinder, an electric push rod, etc.

In some embodiments, the second structural member 13122 and the third structural member 13123 are rotatably connected to the trunk module 12 through a same rotating shaft, and the third structural member 13123 is located between the second structural member 13122 and the trunk module 12.

Referring to FIGS. 7 and 8, the difference from the structure in FIG. 5 is that the fourth rotating shaft and the sixth rotating shaft are the same rotating shaft, that is, the second structural member 13122 and the third structural member 13123 are rotatably connected to the trunk module 12 through the same rotating shaft, saving parts and lowering the failure rate.

Figure 9:
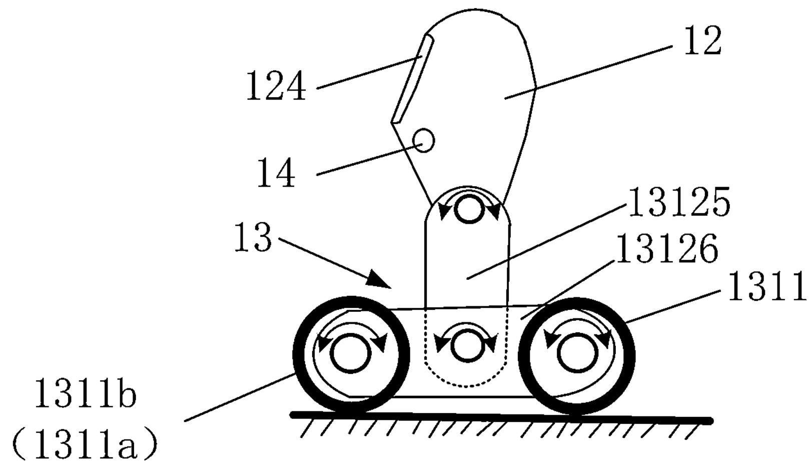
FIG. 9 is an eighth schematic diagram of a three-dimensional state of a robot according to an embodiment of the present application.
Figure 10:
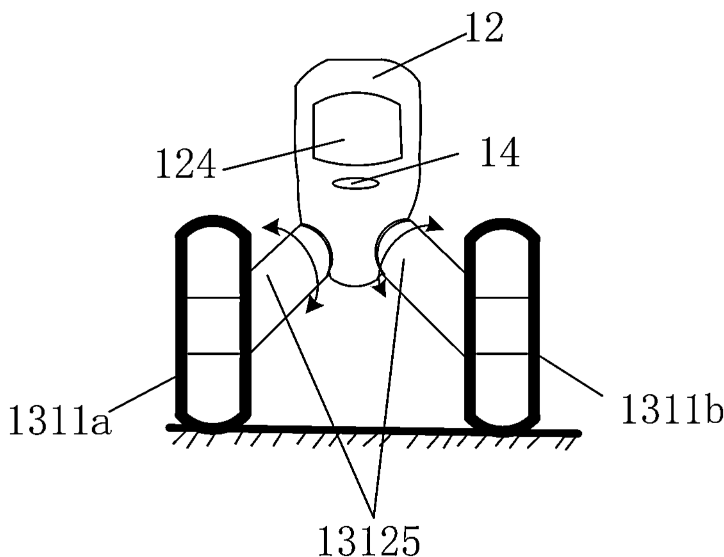
FIG. 10 is a ninth schematic diagram of a three-dimensional state of a robot according to an embodiment of the present application.

In some embodiments, referring to FIGS. 9 and 10, the wheel frame includes a fourth structural member 13125 and a fifth structural member 13126. One end of the fourth structural member 13125 is hinged to the trunk module 12, and the other end of the fourth structural member 13125 is hinged to the fifth structural member 13126. The fifth structural member 13126 is rotatably connected to the plurality of moving elements 1311. The control system 11 adjusts the distance between the two moving elements 1311 and/or the included angle between the two moving elements 1311 through the fourth structural member 13125 and the fifth structural member 13126. The two moving elements 1311 are arranged oppositely on both sides of the trunk module 12, namely the moving element 1311*a* and the moving element 1311*b*.

Figure 11:
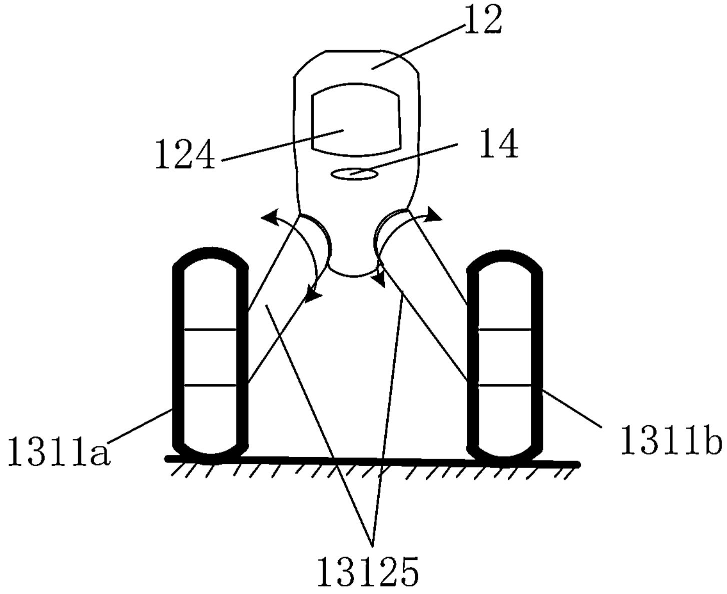
FIG. 11 is a tenth schematic diagram of a three-dimensional state of a robot according to an embodiment of the present application.
Figure 12:
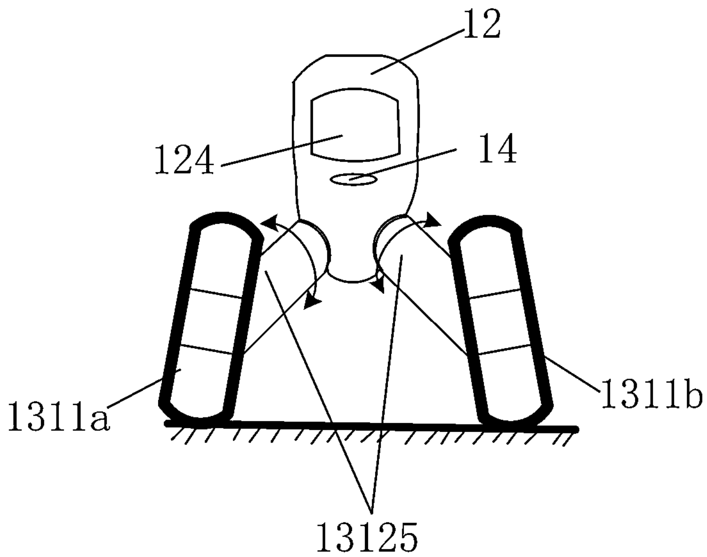
FIG. 12 is an eleventh schematic diagram of a three-dimensional state of a robot according to an embodiment of the present application.

Referring to FIGS. 9 and 10, the wheel frame includes a fourth structural member 13125 and a fifth structural member 13126. The fourth structural member 13125 has two connecting ends, and the fifth structural member 13126 has three connecting ends. The first connecting end of the fourth structural member 13125 is hinged to the trunk module 12, so that the fourth structural member 13125 can rotate at any angle around the first connecting end relative to the trunk module 12. Exemplarily, the first connecting end of the fourth structural member 13125 is ball hinged to the trunk module 12. The second connecting end of the fourth structural member 13125 is hinged to the first connecting end of the fifth structural member 13126, so that the fifth structural member 13126 can rotate at any angle around the second connecting end of the fourth structural member 13125 relative to the fourth structural member 13125. Exemplarily, the second connecting end of the fourth structural member 13125 is ball hinged to the first connecting end of the fifth structural member 13126. The second connecting end of the fifth structural member 13126 is rotatably connected to one of the moving elements through an eighth rotating shaft, and the third connecting end of the fifth structural member 13126 is rotatably connected to the other moving element through a ninth rotating shaft. The control system can adjust the distance between the two moving elements through the fourth structural member 13125 and the fifth structural member 13126, as shown in FIGS. 10 and 11. In one possible implementation, when switching from the posture in FIG. 10 to the posture in FIG. 11, the control system 11 firstly controls the fourth structural member 13125 to lift up the moving element 1311*b* and the moving element 1311*a*, then controls the fourth structural member 13125 to reduce the distance between the moving element 1311*b* and the moving element 1311*a*, and then puts the moving element 1311*b* and the moving element 1311*a* down to the landing state, thereby shortening the distance between the moving element 1311*b* and the moving element 1311*a*. The adjusted posture is shown in FIG. 11. The control system 11 can also adjust the included angle between the two moving elements through the fourth structural member 13125 and the fifth structural member 13126. As shown in FIGS. 10 and 12, the moving element 1311*a* and the moving element 1311*b* can form a figure-eight shape by adjusting the degree of freedom between the fourth structural member 13125 and the fifth structural member 13126, as shown in FIG. 12. Of course, the control system 11 can also adjust only the moving element on one side to tilt toward or away from the moving element on the other side, to increase the postures of the robot.

The robot 1 according to the embodiments of the present application is described below with reference to FIGS. 1 and 2. The robot 1 shown in FIGS. 1 and 2 is only one example, and should not bring any limitation to the functions and usage scope of the embodiments of the present application.

Figure 13:
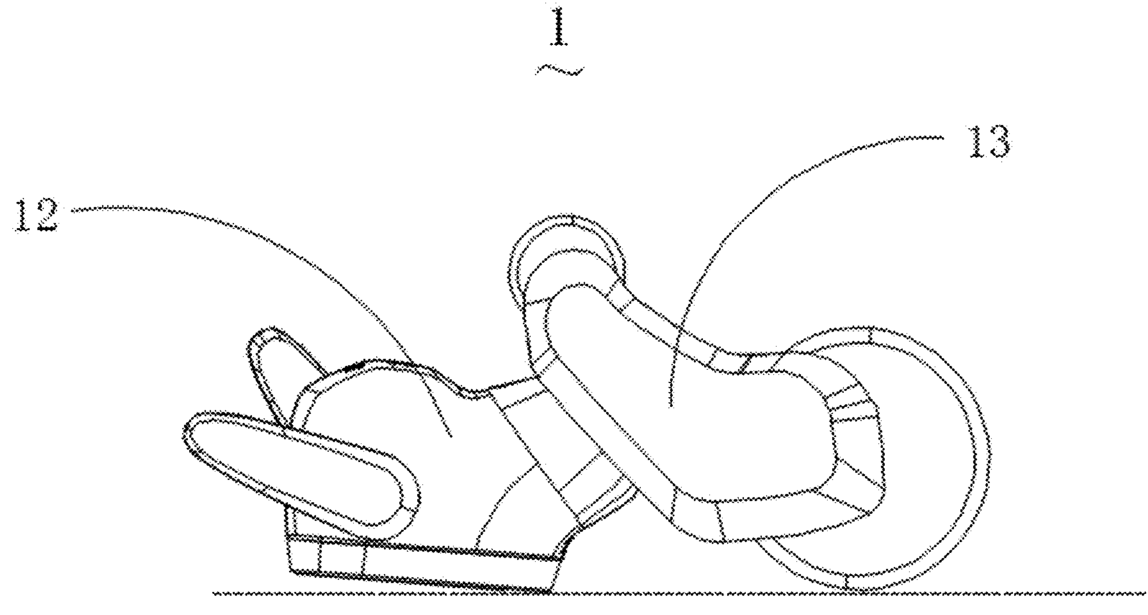
FIG. 13 is a first schematic diagram of a forward tipping state of a robot according to an embodiment of the present application.
Figure 14:
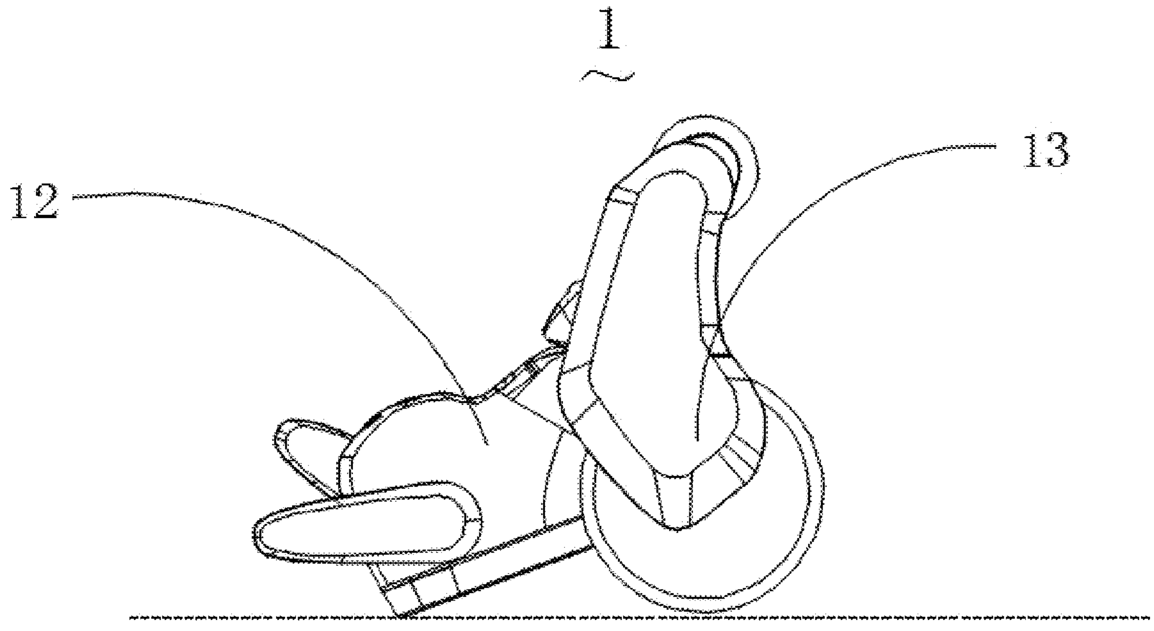
FIG. 14 is a second schematic diagram of a forward tipping state of a robot according to an embodiment of the present application.
Figure 15:
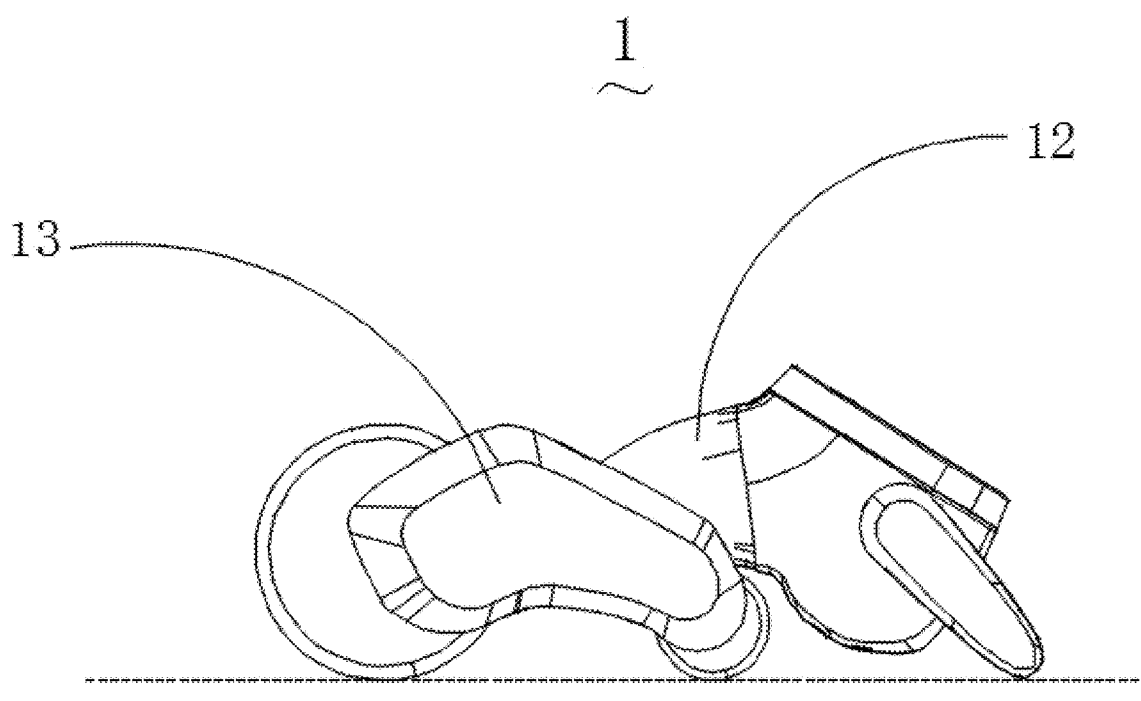
FIG. 15 is a first schematic diagram of a backward tipping state of a robot according to an embodiment of the present application.
Figure 16:
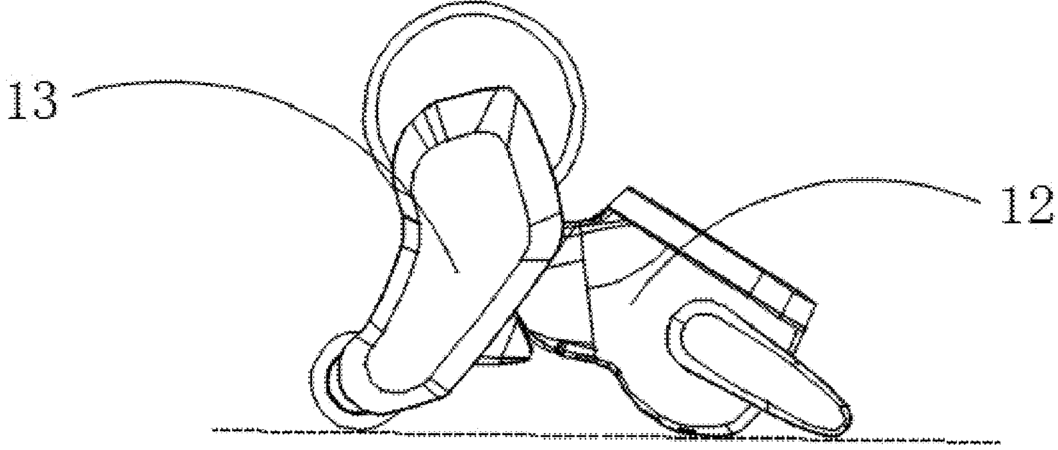
FIG. 16 is a second schematic diagram of a backward tipping state of a robot according to an embodiment of the present application.
Figure 17:
FIG. 17 is a schematic diagram of a tilting state of a robot according to an embodiment of the present application.
Figure 17:
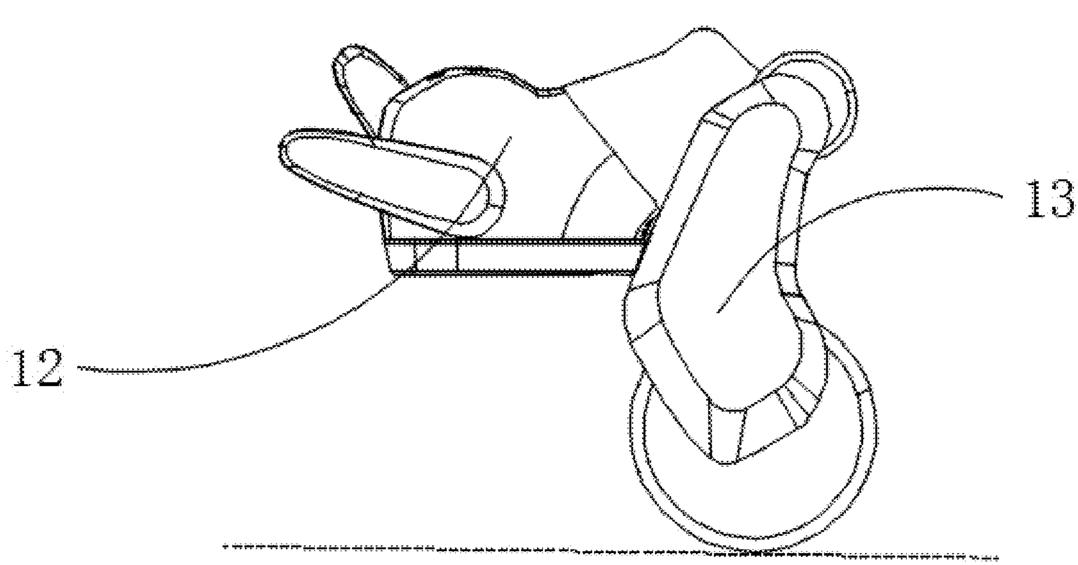
Figure 18:
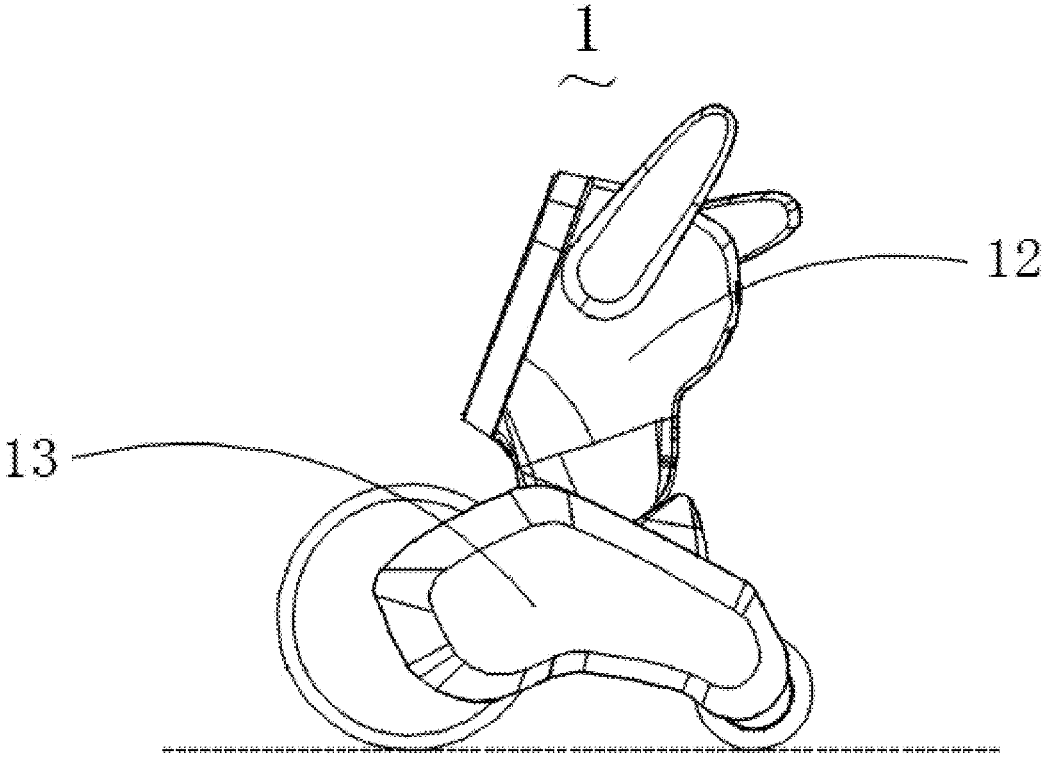
FIG. 18 is a schematic diagram of a four-wheel standing state of a robot according to an embodiment of the present application.
Figure 19:
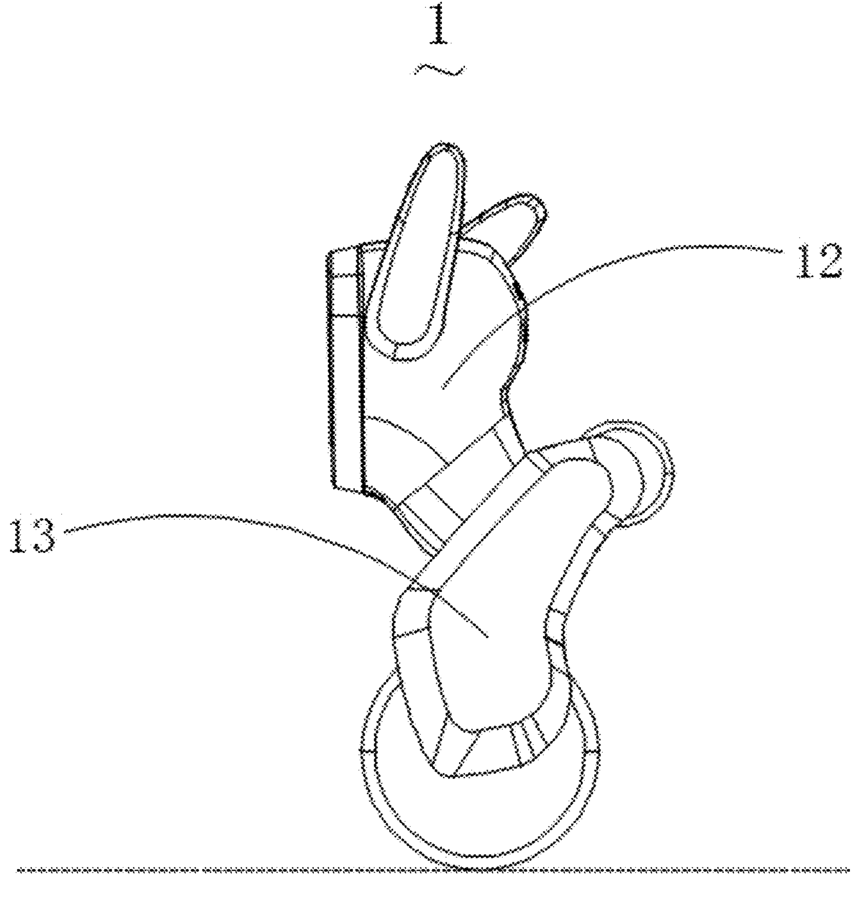
FIG. 19 is a schematic diagram of a two-wheel standing state of a robot according to an embodiment of the present application.
Figure 20A:
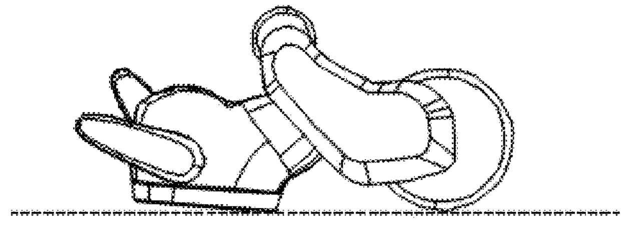
FIG. 20A to FIG. 20D are first schematic diagrams of changes of the overall state of the robot according to embodiments of the present application.
Figure 20B:
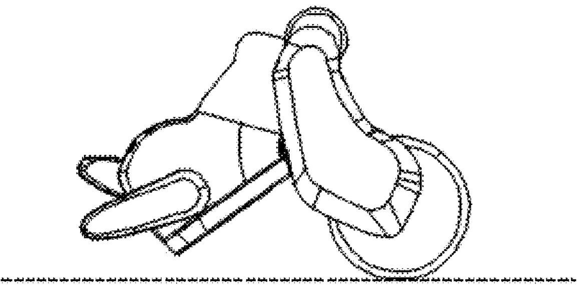
Figure 20C:
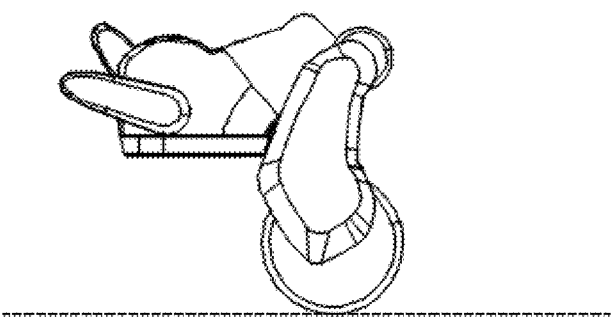
Figure 20D:
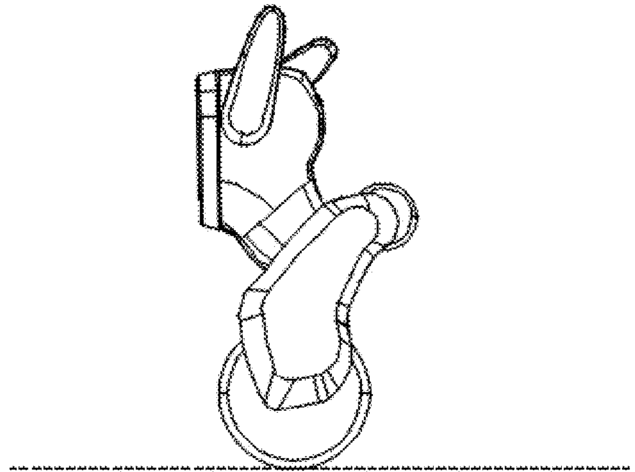

Referring to FIGS. 13 to 19, further in the embodiments of the present application, the overall states of the robot 1 include at least a tipping state, a tilting state and a standing state. Here, the overall state in which the head-face assembly 122 of the robot 1 is in contact with the ground is defined as the tipping state, the tipping state in which the face 1221 of the robot 1 is in contact with the ground is defined as tipping forward (as shown in FIGS. 13 and 14), and the tipping state in which the back of the head 1222 of the robot 1 is in contact with the ground is defined as tipping backward (as shown in FIGS. 15 and 16). The state in which the head-face assembly 122 of the robot 1 is not in contact with the ground but has a tendency to tip over is defined as the tilting state (as shown in FIG. 17). The state of the robot 1 except the tipping state and tilting state is defined as the standing state, the standing state in which all rollers of the robot 1 are in contact with the ground at the same time is defined as the four-wheel standing state (as shown in FIG. 18), and the state in which only the driving wheels 1313 of the robot 1 are in contact with the ground at the same time is defined as the two-wheel standing state (FIG. 19).

In combination with FIG. 3 and FIG. 13 to FIG. 19, the robot 1 further includes a sensing system 14 that monitors the component posture and position state of the robot 1, and the control system 11 obtains the overall status of the robot 1 according to the component posture and position state. When the overall state is the tipping or tilting state, the control system 11 controls the trunk module 12 to rotate relative to the leg module 13 and/or the moving element 1311 to rotate, so that the robot 1 balances autonomously. Optionally, in some embodiments of the present application, the sensing system 14 is provided on the leg assembly 131 and/or the head-face assembly 122 and/or the body assembly 123.

It can be understood that the sensing system 14 is arranged so that the robot 1 can monitor the component posture and position state of the robot 1 through the sensing system 14, that is, the sensing system 14 can monitor the action and posture of the robot 1. As a result, the control system 11 can judge the stable state of the robot 1 according to the monitoring result of the sensing system 14, and control the trunk module 12 to rotate relative to the leg module 13 and/or control the moving elements 1311 to rotate according to the current stable state of the robot 1, so as to adjust the center of gravity and the action and posture of the robot 1 according to actual needs, thereby enabling the robot 1 to achieve the function of autonomous balance. Therefore, the sensing system 14 cooperates with the control system 11 to greatly improve the stability, flexibility and environmental adaptability of the robot 1, further ensuring that the robot 1 can operate and act autonomously in more complex environments.

Further, the sensing system 14 includes an angle detection component 143 that detects a relative angle between the leg module 13 and the trunk module 12, and the control system 11 obtains the component posture of the robot 1 according to the relative angle.

Further, the sensing system 14 includes a first sensing component 141 that monitors a positional relationship of the center of gravity of the robot 1 relative to the ground to obtain the position state of the robot 1, and the control system 11 determines whether the robot 1 has a tendency to tip over according to the position state and the component posture. When the robot 1 has a tendency to tip over, the control system 11 controls the trunk module 12 to rotate relative to the leg module 13 and/or the moving element 1311 to rotate, so that the robot 1 generates torque in a direction opposite to a tipping direction to prevent the robot 1 from tipping over, thereby allowing the robot 1 to achieve the autonomous balance.

It can be understood that the first sensing component 141 can monitor the positional relationship of the center of gravity of the robot 1 relative to the ground to obtain the position state of the robot 1, so that the control system 11 can know whether the robot 1 has a tendency to tip over, that is, the control system 11 can judge whether the current center of gravity of the robot 1 is stable based on the monitoring result of the first sensing component 141. If the control system 11 judges that the current center of gravity of the robot 1 is unstable and a tipping problem may occur, the control system 11 can control the trunk module 12 to rotate relative to the leg module 13 to thereby generate torque in the opposite direction to the tipping direction of the robot 1, to prevent the robot 1 from tipping over and thus enable the robot 1 to balance autonomously.

Further, the control system 11 can also determine whether the robot 1 is in the tipping state according to the position state and the component posture. When the robot 1 is in the tipping state, the control system 11 controls the trunk module 12 to rotate relative to the leg module 13 and/or the moving element 1311 to rotate, so as to enable the robot 1 to be in the standing state.

It can be understood that the control system 11 can also judge whether the robot 1 has been in the tipping state according to the monitoring result of the first sensing component 141. If the control system 11 judges that the robot 1 has been currently in the tipping state, the control system 11 can control the trunk module 12 to rotate relative to the leg module 13 and/or the moving elements 1311 to rotate, thereby changing the action posture of the robot 1, enabling the robot 1 to restore to the standing state, and further ensuring the autonomous balance ability of the robot 1. It can be seen that the design of the first sensing component 141 in cooperation with the control system 11 can not only prevent the robot 1 from tipping over to make the robot 1 more stable, but also enable the robot 1 to restore to the standing state autonomously when the robot 1 has tipped over, thus effectively ensuring the stability, reliability and environmental adaptability of the robot 1.

Further, the first sensing component 141 includes a trunk detection component 1411, and the trunk detection component 1411 obtains the trunk position information by monitoring the positional relationship of the center of gravity of the head-face assembly 122 and/or the body assembly 123 relative to the ground, and transmits the trunk position information to the control system 11.

Optionally, the control system 11 obtains the leg position information in two optional ways as follows. In the first way, the control system 11 obtains the leg position information through calculation according to the trunk position information and the component posture. In the second way, the first sensing component 141 further includes a leg detection component 1412 that obtains the leg position information by monitoring the positional relationship of the center of gravity of the leg module 13 relative to the ground and sends the leg position information to the control system 11, so that the control system 11 directly obtains the leg position information.

Specifically, in some embodiments of the present application, the control system 11 obtains the leg position information in the first way. After obtaining the trunk position information and the leg position information, the control system 11 can analyze and obtain the position state of the robot 1 based on the trunk position information and the leg position information.

Further, the first sensing component 141 includes one or a combination of an inertial measurement unit, an acceleration sensor and an angular velocity sensor. The first sensing component 141 monitors the positional relationship of the center of gravity of the robot 1 relative to the leg module 13 and the ground by monitoring the acceleration and/or angular velocity of the robot 1. When the control system 11 analyzes and then obtains the detection result of the first sensing component 141 and judges that the robot 1 tips over, the control system 11 controls the first action component 121 and/or the second action component 1315 to act, so that the robot 1 restores to the standing state.

Further, the sensing system 14 also includes a second sensing component 142 that monitors whether the moving element 1311 is idling, and the control system 11 judges whether the robot 1 tips over based on the monitoring result of the second sensing component 142 and the position state. When the robot 1 tips over, the control system 11 controls the trunk module 12 to rotate relative to the leg module 13 and/or the moving element 1311 to rotate, so that the robot 1 restores to the standing state.

It can be understood that the second sensing component 142 monitors whether the moving element 1311 is idling, and the control system 11 can judge whether the robot 1 has tipped over based on the monitoring result of the second sensing component 142. If the control system 11 judges that the robot 1 has been currently in the tipping state, the control system 11 can control the trunk module 12 to rotate relative to the leg module 13 and/or the moving elements 1311 to rotate, thereby changing the action posture of the robot 1, enabling the robot 1 to restore to the standing state, and further ensuring the autonomous balance ability of the robot 1. It can be seen that the design of the second sensing component 142 in cooperation with the control system 11 can further ensure that the robot 1 can accurately detect the tipping state and thus adjust the overall action posture according to the current tipping state until the robot 1 restores to the standing state, further improving the autonomous balance ability and stability of the robot 1.

Further, the second sensing component 142 includes an inertial sensor. The second sensing component 142 detects the inertial parameter of the driving wheel 1313 through the inertial sensor, and monitors whether the driving wheel 1313 is idling through the inertial parameter. Exemplarily, the inertial sensor detects the inertial parameter of the robot 1 in real time and feeds the inertial parameter back to the control system 11. When the control system 11 detects that the received inertial parameter mutates and reaches a preset threshold, the control system 11 determines that the driving wheel 1313 of the robot 1 is idling. When the control system 11 analyzes and finds that the idling of the driving wheel 1313 is abnormal idling, the control system 11 determines that the robot 1 tips over, and then the control system 11 controls the first action component 121 and/or the second action component 1315 to act, so that the robot 1 restores to the standing state. It can be understood that abnormal idling means that the control system 11 detects that the driving wheel 1313 is idling when the control system 11 does not control the driving wheel 1313 to switch to the state of being lifted off the ground.

Furthermore, the control system 11 also judges whether the robot 1 has left the ground based on the detection result of the second sensing component 142. Exemplarily, when the second sensing component 142 detects that all driving wheels 1313 of the robot 1 are idling, the control system 11 determines that the robot 1 has left the ground, and then the control system 11 controls the robot 1 to stop and try to restore to the standing state by changing the overall state of the robot 1.

If the robot 1 tips over, the control system 11 firstly judges the tipping mode of the robot 1, and then controls the robot 1 to restore to the standing state according to the tipping mode. The robot 1 has four tipping modes as follows.

Referring to FIG. 20A to FIG. 20D, in the first mode, when the robot 1 tips forward from the two-wheel standing state, the process of restoring the robot 1 to the standing state is as follows: the first action component 121 rotates to simultaneously drive two wheel frames 1312 to rotate relative to the trunk module 12, causing the center of gravity of the robot 1 to rise, and simultaneously reducing the distance between the head-face assembly 122 of the robot 1 and the driving wheel 1313; then the second action component drives the driving wheel 1313 to acceleratedly rotate forward, and then the driving wheel 1313 will exert a backward force on the leg assembly 131 when the robot 1 acceleratedly moves forward, where this force can restore the robot 1 to the two-wheel standing state.

Figure 21A:
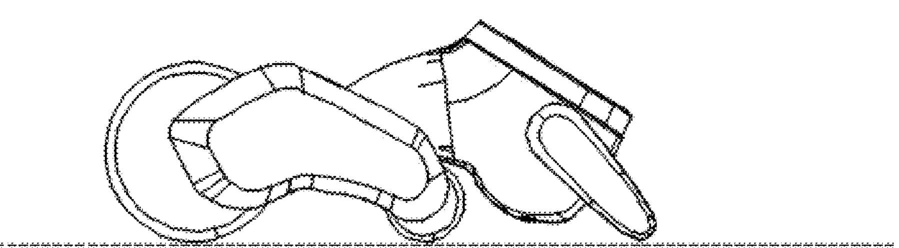
FIG. 21A to FIG. 21C are second schematic diagrams of changes of the overall state of the robot according to embodiments of the present application.
Figure 21B:
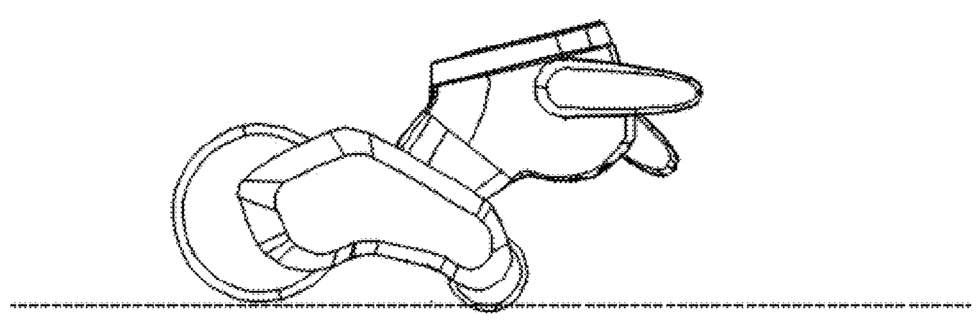
Figure 21C:
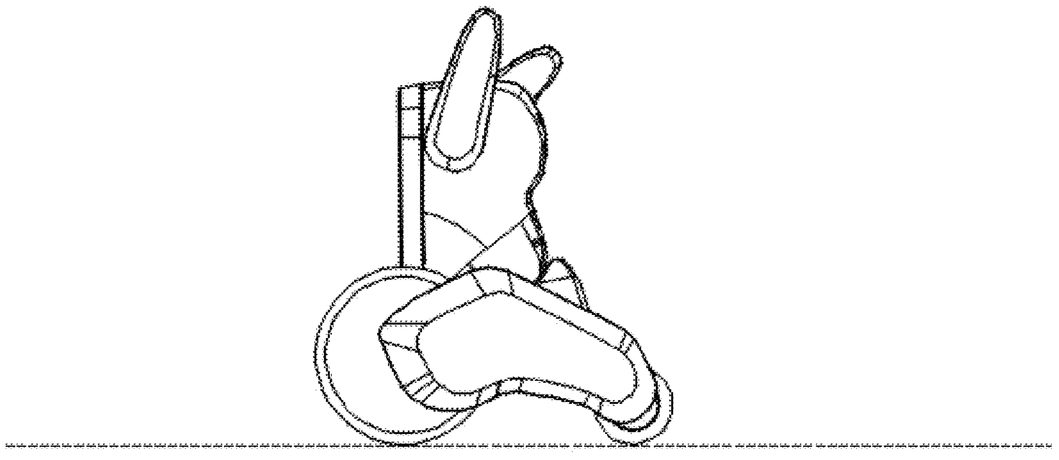

Referring to FIG. 21A to FIG. 21C, in the second mode, when the robot 1 tips backward from the two-wheel standing state, the process of restoring the robot 1 to the standing state is as follows: the first action component 121 rotates to drive the trunk module 12 to rotate toward the driving wheel 1313 relative to the wheel frame 1312, until the robot 1 restores to the four-wheel standing state.

Figure 22A:
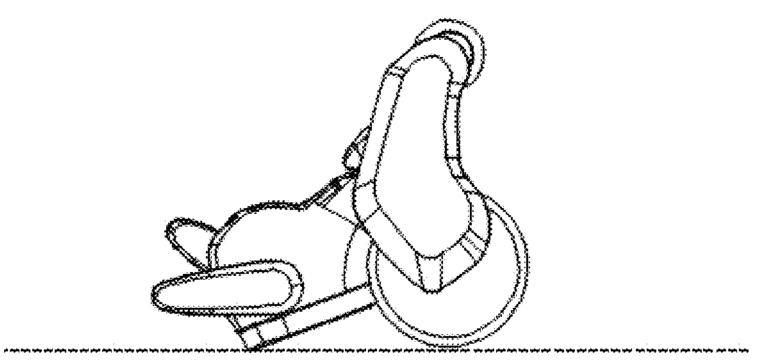
FIG. 22A to FIG. 22C are third schematic diagrams of changes of the overall state of the robot according to embodiments of the present application.
Figure 22B:
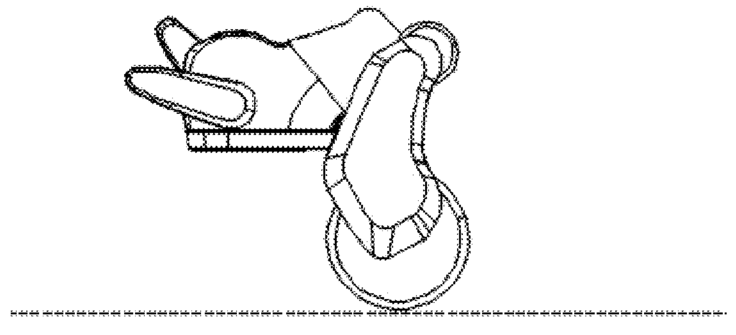
Figure 22C:
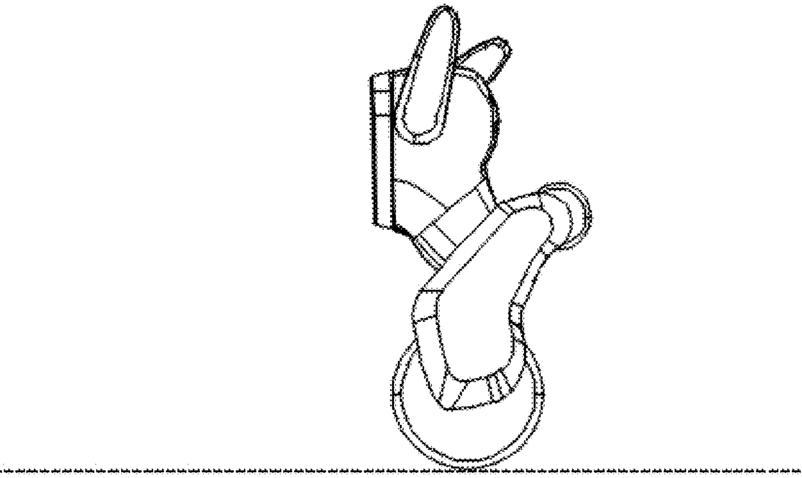
Figure 23A:
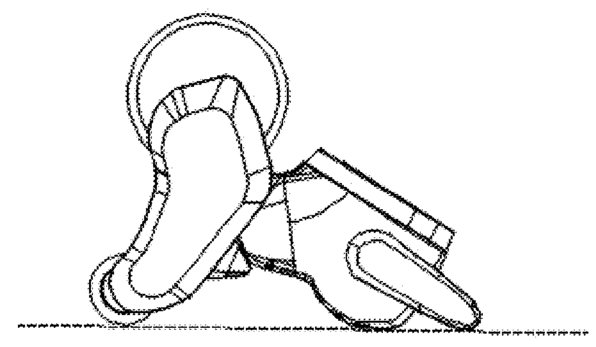
FIG. 23A to FIG. 23D are fourth schematic diagrams of changes of the overall state of the robot according to embodiments of the present application.
Figure 23B:
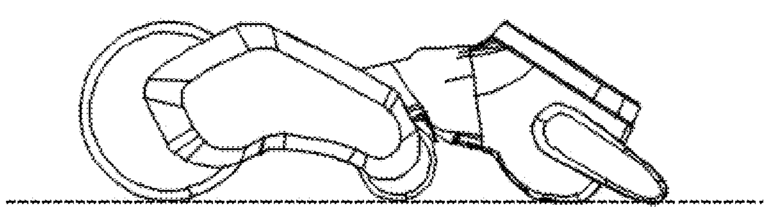
Figure 23C:
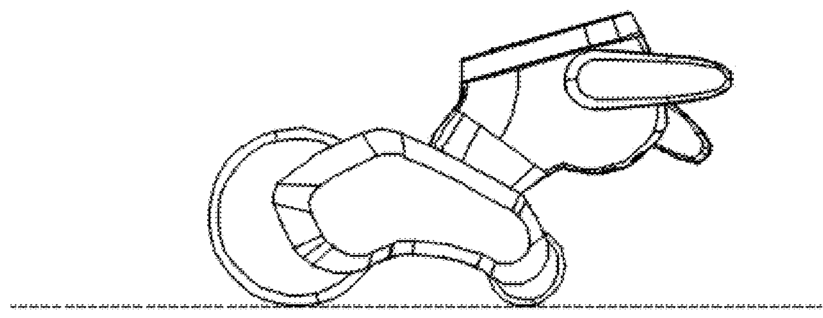
Figure 23D:
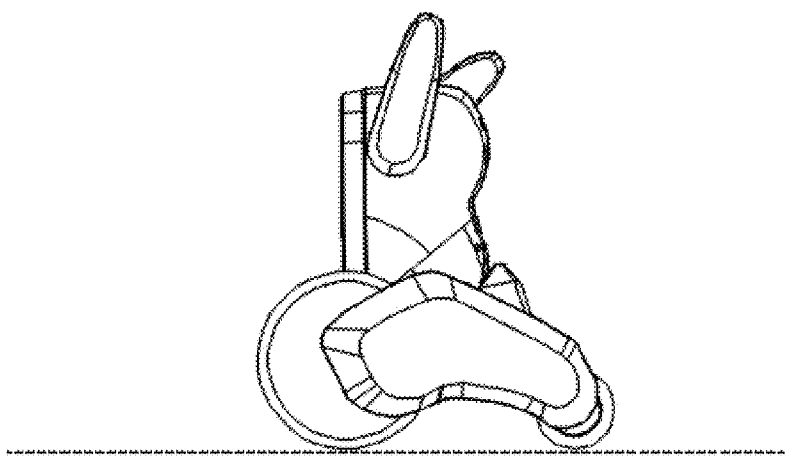
Figure 24A:
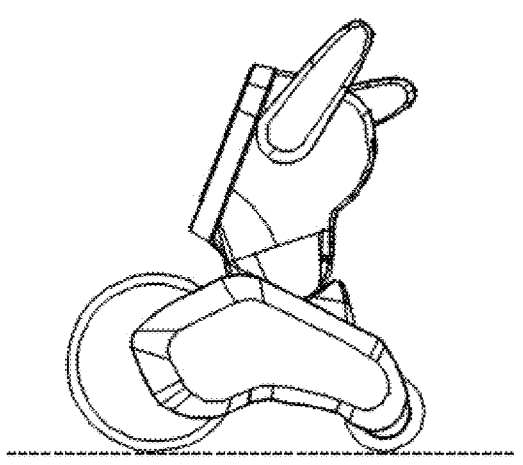
FIG. 24A to FIG. 24D are fifth schematic diagrams of changes of the overall state of the robot according to embodiments of the present application.
Figure 24B:
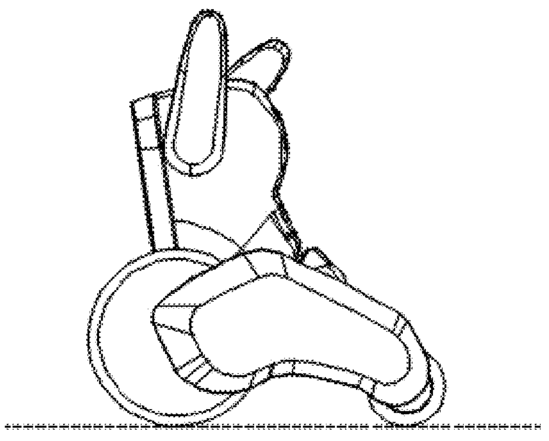
Figure 24C:
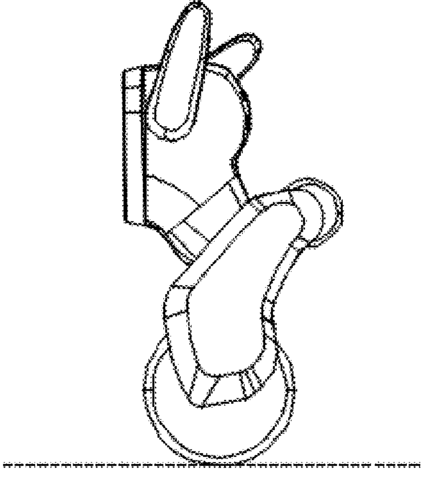
Figure 24D:
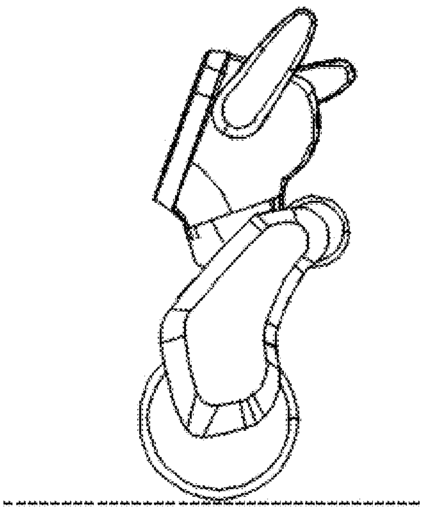

Referring to FIG. 22A to FIG. 22C, in the third mode, when the robot 1 tips forward from the four-wheel standing state, the first action component 121 firstly rotates to drive the trunk module 12 to rotate toward the driving wheel 1313 relative to the wheel frame 1312, and in addition, the second action component 1315 rotates to drive the driving wheel 1313 to rotate backward until the head-face assembly 122 moves above the driving wheel 1313; and then the first action component 121 rotates to drive the trunk module 12 to rotate toward the driven wheel 1314 relative to the wheel frame 1312, until the robot 1 restores to the two-wheel standing state.

Referring to FIG. 23A to FIG. 23D, in the fourth mode, when the robot 1 tips backward from the four-wheel standing state, the first action component 121 firstly rotates to drive the trunk module 12 to rotate toward the driven wheel 1314 relative to the wheel frame 1312, until the driving wheel 1313 and the driven wheel 1314 touch the ground at the same time. Then the first action component 121 drives the trunk module 12 to rotate toward the driving wheel 1313 relative to the wheel frame 1312, until the robot 1 restores to the four-wheel standing state.

Referring to FIG. 24A to FIG. 24D, the process of transforming the robot 1 from the four-wheel standing state to the two-wheel standing state is as follows: the first action component 121 rotates to drive the trunk module 12 rotate toward the driven wheel 1314 relative to the wheel frame 1312, and in addition, the second action component 1315 rotates to drive the driving wheel 1313 to rotate forward, until the robot 1 changes to the two-wheel standing state.

The robot provided in the embodiments of the present application includes a control system, a trunk module and a leg module connected to the trunk module. The control system can control at least one moving element to switch between the state of being lifted off the ground and the state of being in contact with the ground, so as to change the overall state of the robot and make the actions of the robot more flexible and changeable. For example, when all the moving elements are in contact with the ground, the robot is in a prone position, like a cute pet with all feet on the ground; when some of the moving elements are lifted off the ground, the robot is in the standing state, like a cute pet with some feet standing and some feet lifted. The actions of the robot are more flexible and richer, providing basic conditions for the in-depth advancement of human-computer interaction. Moreover, the design that the control system can control at least one moving element to switch between the state of being lifted off the ground and the state of being in contact with the ground enables the robot to adapt to more complex environments. For example, the robot can control some of the moving elements to be lifted off the ground to bypass obstacles; or when the robot has a tendency to tilt, the moving elements that are lifted off the ground are switched to the state of being in contact with the ground, to prevent the robot from tipping over. As can be seen, the design that the control system can control at least one moving element to switch between the state of being lifted off the ground and the state of being in contact with the ground greatly improves the flexibility, adaptability and reliability of the actions of the robot.

In the robot provided in the embodiments of the present application, the arrangement of the first action component with the output end drivingly connected to the leg module enables the leg module to move relative to the trunk module, so that the robot can realize the function that the trunk module and the leg module can move separately or only one of the two modules moves as needed, thereby further effectively improving the flexibility of the movement and action of the robot and the adaptability of the robot to the environment, and also further enhancing the expressiveness of the robot, and making the robot more in line with the bionic requirement.

In the robot provided in the embodiments of the present application, the design of arranging at least two leg assemblies on opposite sides of the trunk module makes the robot easier to maintain balance and stability, further improving the robot's adaptability to different terrains. Moreover, the design of the leg assemblies arranged on opposite sides of the trunk module allows the center of gravity of the trunk module to be relatively closer to the ground, thus reducing the height of the overall center of gravity of the robot, further improving the stability of the robot and making it less likely to tip over, and thereby further improving the robot's adaptability to the environment.

The robot provided in the embodiments of the present application is provided with a wheel frame connected to a plurality of moving elements, so that the control system can control the rotation of the wheel frame relative to the trunk module to switch the moving elements between the state of being lifted off the ground and the state of being in contact with the ground, thereby changing the overall state of the robot. The design of the wheel frame allows a plurality of moving elements in the same leg assembly to move in association, thereby enriching the actions of the robot. For example, some moving elements on one leg assembly in contact with the ground support other moving elements to lift off the ground, so that the robot can complete the action that some of the moving elements are in the state of being in contact with the ground and some of the moving elements are in the state of being lifted off the ground. Moreover, the way of connecting a plurality of moving elements in one leg assembly through the wheel frame facilitates the synchronous movement of the plurality of moving elements, thereby further improving the movement stability of the robot. It can be seen that the arrangement of the wheel frame further improves the richness and stability of the actions of the robot.

In the robot provided in the embodiments of the present application, the wheel frame is designed with a plurality of connecting sections that can move relatively through a joint, so that the action modes between the wheel frame and the moving elements on the wheel frame are more diverse, that is, the actions of the leg assemblies are more flexible and changeable. For example, the robot can support the trunk module and other leg assemblies through the joint in contact with the ground. Moreover, the connecting sections are movably connected through the joint, so that the center of gravity of the robot can also be adjusted through the relative movement between the connecting sections when the robot moves on uneven ground or the center of gravity is unstable, thereby making the stability of the robot higher.

In the robot provided in the embodiments of the present application, the design of arranging two leg assemblies and arranging a plurality of moving elements at opposite ends of each leg assembly further ensures the symmetry of the overall design of the robot and thus ensures that the center of gravity of the robot is relatively centered relative to the two leg assemblies, so that the overall stability of the robot is higher, thereby also enabling the robot to stably implement more relatively complex actions, and also enabling the robot to extend at a relatively larger angle during action, thus further improving the flexibility and richness of actions of the robot. Moreover, the design of the plurality of moving elements arranged at opposite ends of each leg assembly ensures that each leg assembly can achieve the action that one end is in contact with the ground while the other end lifts off the ground, thus further ensuring the action diversity of the robot.

In the robot provided in the embodiments of the present application, the design that at least one of the two first moving elements is a driving wheel enables the robot to move under the drive of the first leg assembly. Moreover, the design that at least one of the two second moving elements is a driving wheel enables the robot to also move under the drive of the second leg assembly, thereby ensuring the movement flexibility of the robot.

In the robot provided in the embodiments of the present application, the design of arranging a plurality of output ends and drivingly connecting each output end to one corresponding wheel frame ensures that each wheel frame can rotate relative to the trunk module under the drive of the output end, thereby further improving the action flexibility of the robot. When the plurality of output ends are driven by the same driving member at the same time, a plurality of wheel frames can act synchronously, so as to implement actions such as the same ends of the plurality of wheel frames are in contact with the ground at the same time and the other ends thereof are lifted off the ground at the same time. When the plurality of output ends are driven by a plurality of driving members respectively, the plurality of wheel frames can also act autonomously, so as to implement actions such as one end of only one wheel frame is in contact with the ground and the other end thereof is lifted off the ground while both ends of other wheel frames are in contact with the ground. Further, corresponding to the two leg assemblies, the design of arranging output ends driven by two driving members respectively ensures that both of the two leg assemblies can act autonomously under the drive of the output ends, further improving the flexibility of the robot's actions and simultaneously making the bionic effect of the robot better.

In the robot provided in the embodiments of the present application, the sensing system is provided so that the robot can monitor the positional relationship of the center of gravity of the robot relative to the leg module and the ground through the sensing system, and/or the robot can detect the rotation state of the moving element through the sensing system, that is, the sensing system can monitor the action and posture of the robot. As a result, the control system can judge the stable state of the robot according to the monitoring result of the sensing system, and control the trunk module to rotate relative to the leg module and/or control the moving elements to rotate according to the current stable state of the robot, so as to adjust the center of gravity and the action and posture of the robot according to actual needs, thereby enabling the robot to achieve the function of autonomous balance. Therefore, the sensing system cooperates with the control system to greatly improve the stability, flexibility and environmental adaptability of the robot, further ensuring that the robot can operate and act autonomously in more complex environments.

In the robot provided in the embodiments of the present application, the first sensing component can monitor the positional relationship of the center of gravity of the robot relative to the leg module and the ground, so that the control system can know whether the robot has a tendency to tip over, that is, the control system can judge whether the current center of gravity of the robot is stable based on the monitoring result of the first sensing component. If the control system judges that the current center of gravity of the robot is unstable and a tipping problem may occur, the control system can control the trunk module to rotate relative to the leg module to thereby generate torque in the opposite direction to the tipping direction of the robot, to prevent the robot from tipping over and thus enable the robot to balance autonomously. Moreover, the control system can also judge whether the robot has been in the tipping state according to the monitoring result of the first sensing component. If the control system judges that the robot has been currently in the tipping state, the control system can control the trunk module to rotate relative to the leg module and/or the moving elements to rotate, thereby changing the action posture of the robot, enabling the robot to restore to the standing state, and further ensuring the autonomous balance ability of the robot. It can be seen that the design of the first sensing component in cooperation with the control system can not only prevent the robot from tipping over to make the robot more stable, but also enable the robot to restore to the standing state autonomously when the robot has tipped over, thus effectively ensuring the stability, reliability and environmental adaptability of the robot.

In the robot provided in the embodiments of the present application, the body assembly connects the head-face assembly with the leg module, and the rotation of the body assembly relative to the leg module drives the rotation of the head-face assembly relative to the leg module, so that the head-face assembly of the robot can rotate relative to the leg module through the rotation of the body assembly, further improving the richness and flexibility of the actions of the robot, and simultaneously making the bionic effect of the robot better.

It should be noted that the "ground" or "floor" in the present application refers to the working contact surface of the moving element in the usual sense, and is called the ground for convenience only, but not necessarily limited to the floor, and may also be a vertical wall or an inverted top or other working surface on which moving elements can move.

The above description is only preferred embodiments of the present application and is not intended to limit the present application. Any modifications, equivalent replacements, improvements and others made within the principle of the present application are all contained in the protection scope of the present application.

What is claimed is:

1. A robot, comprising:

a control system, a trunk module, and a leg module connected to the trunk module;

wherein the leg module comprises at least one leg assembly, the leg assembly comprises a plurality of connected moving elements, and the control system is able to control at least one of the moving elements to switch between a state of being lifted off ground and a state of being in contact with the ground to change an overall state of the robot;

wherein the trunk module comprises a first action component, and an output end of the first action component is drivingly connected to the leg module;

the leg module comprises at least two leg assemblies arranged on opposite sides of the trunk module, and the trunk module is rotatable relative to the leg assemblies;

the leg assembly further comprises a wheel frame connected to the plurality of moving elements, and the control system controls the wheel frame to rotate relative to the trunk module so that the moving element switches between the state of being lifted off the ground and the state of being in contact with the ground;

the wheel frame comprises a first structural member rotatably connected to the trunk module, and one side of the first structural member away from the trunk module is rotatably connected to the plurality of moving elements; or the wheel frame comprises a second structural member and a third structural member; the second structural member is rotatably connected to the trunk module, and one side of the second structural member away from the trunk module is rotatably connected to at least one moving element; and the third structural member is rotatably connected to the trunk module, and one side of the third structural member away from the trunk module is rotatably connected to at least one moving element; or the wheel frame comprises a fourth structural member and a fifth structural member; one end of the fourth structural member is hinged to the trunk module, and other end of the fourth structural member is hinged to the fifth structural member, and the fifth structural member is rotatably connected to a plurality of moving elements; and the control system adjusts a distance between two moving elements and/or an included angle formed between two moving elements through the fourth structural member and the fifth structural member, wherein the two moving elements are oppositely arranged on both sides of the trunk module.

2. The robot according to claim 1, wherein the wheel frame comprises a plurality of connecting sections and a joint for connecting the connecting sections, and the control system is able to control the plurality of connecting sections to move relative to each other through the joint.

3. The robot according to claim 1, wherein in a case that the wheel frame comprises the second structural member and the third structural member, the wheel frame further comprises a telescopic mechanism;

one end of the telescopic mechanism is movably connected to the second structural member, and the other end of the telescopic mechanism is movably connected to the third structural member, for controlling an angle change of a first included angle, wherein the first included angle is an included angle of an opening formed by the second structural member and the third structural member away from the trunk module.

4. The robot according to claim 3, wherein the second structural member and the third structural member are rotatably connected to the trunk module through a same rotating shaft, and the third structural member is located between the second structural member and the trunk module.

5. The robot according to claim 1, wherein the leg module comprises two leg assemblies, defined as a first leg assembly and a second leg assembly respectively;

the first leg assembly comprises a first wheel frame and moving elements provided on the first wheel frame, the moving elements provided on the first wheel frame are defined as first moving elements, a quantity of the first moving elements is at least two, and the first moving elements are arranged at opposite ends of the first wheel frame; and the second leg assembly comprises a second wheel frame and moving elements provided on the second wheel frame, the moving elements provided on the second wheel frame are defined as second moving elements, a quantity of the second moving elements is at least two, and the second moving elements are arranged at opposite ends of the second wheel frame.

6. The robot according to claim 5, wherein:

the quantity of the first moving elements is two, and at least one of the two first moving elements is a driving wheel, defined as a first driving wheel; and the control system is able to control the first driving wheel to rotate; and/or the quantity of the second moving elements is two, and at least one of the two second moving elements is a driving wheel, defined as a second driving wheel; and the control system is able to control the second driving wheel to rotate.

7. The robot according to claim 5, wherein the first action component comprises two output ends provided at opposite ends of the trunk module, the two output ends are driven respectively by two driving members and defined as a first output end and a second output end, the first output end is drivingly connected to the first wheel frame, and the second output end is drivingly connected to the second wheel frame.

8. The robot according to claim 1, wherein the first action component comprises a plurality of output ends, and each output end is drivingly connected to one corresponding wheel frame.

9. The robot according to claim 8, wherein the plurality of output ends are driven simultaneously by a same driving member or driven respectively by a plurality of driving members.

10. The robot according to claim 1, further comprising a sensing system, wherein the sensing system monitors a component posture and a position state of the robot, and the control system obtains the overall state of the robot according to the component posture and the position state; when the overall state is a tipping or tilting state, the control system controls the trunk module to rotate relative to the leg module and/or the moving element to rotate, so that the robot balances autonomously.

11. The robot according to claim 10, wherein the sensing system comprises an angle detection component that detects a relative angle between the leg module and the trunk module, and the control system obtains the component posture of the robot according to the relative angle.

12. The robot according to claim 11, wherein the sensing system further comprises a first sensing component that monitors a positional relationship of a center of gravity of the robot relative to the ground to obtain the position state of the robot, and the control system determines whether the robot has a tendency to tip over according to the position state and the component posture; when the robot has a tendency to tip over, the control system controls the trunk module to rotate relative to the leg module and/or the moving element to rotate, so that the robot generates torque in a direction opposite to a tipping direction to prevent the robot from tipping over; and/or the control system determines whether the robot is in the tipping state according to the position state and the component posture; when the robot is in the tipping state, the control system controls the trunk module to rotate relative to the leg module and/or the moving element to rotate, so as to make the robot in a standing state.

13. The robot according to claim 12, wherein:

the first sensing component obtains trunk position information by monitoring a positional relationship of a center of gravity of the trunk module relative to the ground, the control system obtains leg position information according to the trunk position information and the component posture, and the control system obtains the position state of the robot according to the trunk position information and the leg position information; or the first sensing component comprises a trunk detection component and a leg detection component, the trunk detection component obtains trunk position information by monitoring a positional relationship of a center of gravity of the trunk module relative to the ground, the leg detection component obtains leg position information by monitoring a positional relationship of a center of gravity of the leg module relative to the ground, and the control system obtains the position state of the robot according to the trunk position information and the leg position information.

14. The robot according to claim 1, wherein the trunk module comprises a head-face assembly and a body assembly connected movably, the body assembly connects the head-face assembly with the leg module, and rotation of the body assembly relative to the leg module drives rotation of the head-face assembly relative to the leg module.

* * * * *